(12) United States Patent
Wu et al.

(10) Patent No.: US 11,504,214 B2
(45) Date of Patent: Nov. 22, 2022

(54) DEVICES, SYSTEMS, AND COMPUTER-IMPLEMENTED METHODS FOR DENTAL ATTACHMENT TEMPLATES

(71) Applicant: Align Technology, Inc., San Jose, CA (US)

(72) Inventors: Fuming Wu, Pleasanton, CA (US); Jihua Cheng, San Jose, CA (US); Chunhua Li, Cupertino, CA (US); Yan Chen, Cupertino, CA (US); Norman C. Su, Rochester Hills, CA (US)

(73) Assignee: Align Technology, Inc., San Jose, CA (US)

( * ) Notice: Subject to any disclaimer, the term of this patent is extended or adjusted under 35 U.S.C. 154(b) by 494 days.

(21) Appl. No.: 16/409,724

(22) Filed: May 10, 2019

(65) Prior Publication Data

US 2019/0343606 A1    Nov. 14, 2019

Related U.S. Application Data

(60) Provisional application No. 62/670,520, filed on May 11, 2018.

(51) Int. Cl.
*A61C 13/00* (2006.01)
*A61C 7/00* (2006.01)
(Continued)

(52) U.S. Cl.
CPC ............ *A61C 13/0004* (2013.01); *A61C 5/77* (2017.02); *A61C 7/002* (2013.01); *A61C 13/0019* (2013.01); *A61C 7/14* (2013.01)

(58) Field of Classification Search
CPC ....... A61C 13/0004; A61C 5/77; A61C 7/002; A61C 13/0019; A61C 7/14; A61C 7/146; A61C 7/00; A61C 7/12; A61C 7/16
(Continued)

(56) References Cited

U.S. PATENT DOCUMENTS 4,183,141 A * 1/1980 Dellinger ............... A61C 7/146
                                                                    433/24
5,820,368 A    10/1998 Wolk
(Continued)

FOREIGN PATENT DOCUMENTS

DE      202015006255 U1 *  2/2016  .......... A61C 13/235
EP           1570803 A2 *  9/2005  ............ A61C 7/146
(Continued)

*Primary Examiner* — Jacqueline T Johanas
*Assistant Examiner* — Holly T. To
(74) *Attorney, Agent, or Firm* — Shay Glenn LLP

(57) ABSTRACT

The present disclosure provides methods, devices, systems, and computer-implemented methods for forming and placing attachments for use with dental appliances, and more particularly to the design, manufacture, and use of three-dimensionally printed attachment templates for use with orthodontic devices. Dental attachment templates include a cavity with one or more openings for injecting and bonding attachment material directly on a patient's tooth, which allow accurate placement of the attachments while providing the dental practitioner flexibility during the attachment forming process. Digital dental attachment template model techniques can be used to accurately place the cavity and opening.

21 Claims, 10 Drawing Sheets

(51) Int. Cl.
   *A61C 7/14*       (2006.01)
   *A61C 5/77*       (2017.01)
(58) Field of Classification Search
   USPC .......................................................... 433/18
   See application file for complete search history.

(56) References Cited

U.S. PATENT DOCUMENTS

| | | | |
|---|---|---|---|
| 6,183,248 B1 | 2/2001 | Chishti et al. | |
| 6,309,215 B1 * | 10/2001 | Phan .................. | A61C 7/00 |
| | | | 433/24 |
| 6,386,864 B1 | 5/2002 | Kuo | |
| 6,454,565 B2 | 9/2002 | Phan et al. | |
| 6,471,511 B1 | 10/2002 | Chishti et al. | |
| 6,524,101 B1 | 2/2003 | Phan et al. | |
| 6,572,372 B1 | 6/2003 | Phan et al. | |
| 6,607,382 B1 | 8/2003 | Kuo et al. | |
| 6,705,863 B2 | 3/2004 | Phan et al. | |
| 6,783,604 B2 | 8/2004 | Tricca | |
| 6,790,035 B2 | 9/2004 | Tricca et al. | |
| 6,814,574 B2 | 11/2004 | Abolfathi et al. | |
| 6,830,450 B2 | 12/2004 | Knopp et al. | |
| 6,947,038 B1 | 9/2005 | Anh et al. | |
| 7,074,039 B2 | 7/2006 | Kopelman et al. | |
| 7,104,792 B2 | 9/2006 | Taub et al. | |
| 7,121,825 B2 | 10/2006 | Chishti et al. | |
| 7,160,107 B2 | 1/2007 | Kopelman et al. | |
| 7,192,273 B2 | 3/2007 | McSurdy, Jr. | |
| 7,329,122 B1 * | 2/2008 | Scott .................. | A61C 1/084 |
| | | | 433/24 |
| 7,354,270 B2 | 4/2008 | Abolfathi et al. | |
| 7,448,514 B2 | 11/2008 | Wen | |
| 7,481,121 B1 | 1/2009 | Cao | |
| 7,543,511 B2 | 6/2009 | Kimura et al. | |
| 7,553,157 B2 | 6/2009 | Abolfathi et al. | |
| 7,600,999 B2 | 10/2009 | Knopp | |
| 7,674,422 B2 * | 3/2010 | Kuo .................. | B29C 33/565 |
| | | | 264/401 |
| 7,690,917 B2 * | 4/2010 | Marshall ............ | A61C 7/146 |
| | | | 433/2 |
| 7,766,658 B2 | 8/2010 | Tricca et al. | |
| 7,771,195 B2 | 8/2010 | Knopp et al. | |
| 7,854,609 B2 * | 12/2010 | Chen .................. | A61C 7/00 |
| | | | 433/6 |
| 7,871,269 B2 | 1/2011 | Wu et al. | |
| 7,878,801 B2 | 2/2011 | Abolfathi et al. | |
| 7,878,805 B2 | 2/2011 | Moss et al. | |
| 7,883,334 B2 | 2/2011 | Li et al. | |
| 7,909,602 B1 * | 3/2011 | Highland ............ | A61C 7/303 |
| | | | 433/18 |
| 7,914,283 B2 | 3/2011 | Kuo | |
| 7,947,508 B2 | 5/2011 | Tricca et al. | |
| 8,152,518 B2 | 4/2012 | Kuo | |
| 8,172,569 B2 | 5/2012 | Matty et al. | |
| 8,337,199 B2 | 12/2012 | Wen | |
| 8,401,686 B2 * | 3/2013 | Moss .................. | A61C 7/02 |
| | | | 700/98 |
| 8,517,726 B2 | 8/2013 | Kakavand et al. | |
| 8,562,337 B2 | 10/2013 | Kuo et al. | |
| 8,641,414 B2 | 2/2014 | Borovinskih et al. | |
| 8,684,729 B2 | 4/2014 | Wen | |
| 8,758,009 B2 | 6/2014 | Chen et al. | |
| 8,771,149 B2 | 7/2014 | Rahman et al. | |
| 8,899,976 B2 | 12/2014 | Chen et al. | |
| 8,899,977 B2 | 12/2014 | Cao et al. | |
| 8,936,463 B2 | 1/2015 | Mason et al. | |
| 8,936,464 B2 * | 1/2015 | Kopelman .......... | G05B 19/4145 |
| | | | 433/24 |
| 9,022,781 B2 | 5/2015 | Kuo et al. | |
| 9,161,823 B2 | 10/2015 | Morton et al. | |
| 9,241,774 B2 | 1/2016 | Li et al. | |
| 9,326,831 B2 | 5/2016 | Cheang | |
| 9,433,476 B2 | 9/2016 | Khardekar et al. | |
| 9,610,141 B2 | 4/2017 | Kopelman et al. | |
| 9,655,691 B2 | 5/2017 | Li et al. | |
| 9,675,427 B2 | 6/2017 | Kopelman | |
| 9,700,385 B2 | 7/2017 | Webber | |
| 9,744,001 B2 | 8/2017 | Choi et al. | |
| 9,844,424 B2 | 12/2017 | Wu et al. | |
| 10,045,835 B2 | 8/2018 | Boronkay et al. | |
| 10,111,730 B2 | 10/2018 | Webber et al. | |
| 10,150,244 B2 | 12/2018 | Sato et al. | |
| 10,201,409 B2 | 2/2019 | Mason et al. | |
| 10,213,277 B2 | 2/2019 | Webber et al. | |
| 10,299,894 B2 | 5/2019 | Tanugula et al. | |
| 10,363,116 B2 | 7/2019 | Boronkay | |
| 10,383,705 B2 | 8/2019 | Shanjani et al. | |
| D865,180 S | 10/2019 | Bauer et al. | |
| 10,449,016 B2 | 10/2019 | Kimura et al. | |
| 10,463,452 B2 | 11/2019 | Matov et al. | |
| 10,470,847 B2 | 11/2019 | Shanjani et al. | |
| 10,492,888 B2 | 12/2019 | Chen et al. | |
| 10,517,701 B2 | 12/2019 | Boronkay | |
| 10,537,406 B2 | 1/2020 | Wu et al. | |
| 10,537,463 B2 | 1/2020 | Kopelman | |
| 10,548,700 B2 | 2/2020 | Fernie | |
| 10,555,792 B2 | 2/2020 | Kopelman et al. | |
| 10,588,776 B2 | 3/2020 | Cam et al. | |
| 10,613,515 B2 | 4/2020 | Cramer et al. | |
| 10,639,134 B2 | 5/2020 | Shanjani et al. | |
| 10,743,964 B2 | 8/2020 | Wu et al. | |
| 10,758,323 B2 | 9/2020 | Kopelman | |
| 10,781,274 B2 | 9/2020 | Liska et al. | |
| 10,813,720 B2 | 10/2020 | Grove et al. | |
| 10,881,487 B2 | 1/2021 | Cam et al. | |
| 10,912,629 B2 | 2/2021 | Tanugula et al. | |
| 10,959,810 B2 | 3/2021 | Li et al. | |
| 10,993,783 B2 | 5/2021 | Wu et al. | |
| 2002/0192617 A1 | 12/2002 | Phan et al. | |
| 2004/0166462 A1 | 8/2004 | Phan et al. | |
| 2004/0166463 A1 * | 8/2004 | Wen .................... | A61C 7/146 |
| | | | 433/24 |
| 2004/0229185 A1 * | 11/2004 | Knopp ................ | A61C 7/146 |
| | | | 433/24 |
| 2005/0014105 A1 | 1/2005 | Abolfathi et al. | |
| 2005/0186524 A1 | 8/2005 | Abolfathi et al. | |
| 2005/0233276 A1 * | 10/2005 | Kopelman .......... | A61C 7/146 |
| | | | 433/3 |
| 2005/0239013 A1 * | 10/2005 | Sachdeva ............ | A61C 3/00 |
| | | | 433/24 |
| 2005/0244768 A1 | 11/2005 | Taub et al. | |
| 2006/0019218 A1 | 1/2006 | Kuo | |
| 2006/0078841 A1 | 4/2006 | Desimone et al. | |
| 2006/0115782 A1 | 6/2006 | Li et al. | |
| 2006/0115785 A1 | 6/2006 | Li et al. | |
| 2006/0199142 A1 * | 9/2006 | Liu .................... | A61C 7/08 |
| | | | 433/24 |
| 2006/0234179 A1 | 10/2006 | Wen et al. | |
| 2007/0099146 A1 * | 5/2007 | Reising .............. | A61C 7/146 |
| | | | 433/24 |
| 2008/0118882 A1 | 5/2008 | Su | |
| 2008/0160473 A1 | 7/2008 | Li et al. | |
| 2008/0268400 A1 | 10/2008 | Moss et al. | |
| 2008/0286716 A1 | 11/2008 | Sherwood | |
| 2008/0286717 A1 | 11/2008 | Sherwood | |
| 2009/0280450 A1 | 11/2009 | Kuo | |
| 2009/0291406 A1 * | 11/2009 | Namiranian ........ | A61C 7/08 |
| | | | 433/24 |
| 2010/0055635 A1 | 3/2010 | Kakavand | |
| 2010/0129763 A1 | 5/2010 | Kuo | |
| 2010/0159413 A1 * | 6/2010 | Kuo .................... | B33Y 80/00 |
| | | | 433/24 |
| 2010/0239992 A1 * | 9/2010 | Brandt ................ | A61C 7/146 |
| | | | 433/6 |
| 2011/0062609 A1 * | 3/2011 | DeSimone .......... | C08F 2/46 |
| | | | 264/16 |
| 2011/0136072 A1 * | 6/2011 | Li ...................... | A61C 7/14 |
| | | | 433/18 |
| 2011/0244413 A1 * | 10/2011 | Teasdale ............ | A61C 7/146 |
| | | | 433/24 |
| 2011/0269092 A1 | 11/2011 | Kuo et al. | |
| 2014/0067334 A1 | 3/2014 | Kuo | |

(56) References Cited

U.S. PATENT DOCUMENTS

| | | | |
|---|---|---|---|
| 2014/0272757 A1* | 9/2014 | Chishti | A61C 7/28 433/18 |
| 2015/0216627 A1* | 8/2015 | Kopelman | A61C 7/14 433/24 |
| 2015/0265376 A1 | 9/2015 | Kopelman | |
| 2015/0366637 A1 | 12/2015 | Kopelman et al. | |
| 2015/0366638 A1 | 12/2015 | Kopelman et al. | |
| 2016/0193014 A1 | 7/2016 | Morton et al. | |
| 2016/0242870 A1 | 8/2016 | Matov et al. | |
| 2016/0242871 A1 | 8/2016 | Morton et al. | |
| 2016/0361139 A1* | 12/2016 | Webber | A61C 7/36 |
| 2017/0007359 A1 | 1/2017 | Kopelman et al. | |
| 2017/0007360 A1 | 1/2017 | Kopelman et al. | |
| 2017/0007361 A1 | 1/2017 | Boronkay et al. | |
| 2017/0007365 A1 | 1/2017 | Kopelman et al. | |
| 2017/0007366 A1 | 1/2017 | Kopelman et al. | |
| 2017/0007368 A1* | 1/2017 | Boronkay | B33Y 50/02 433/6 |
| 2017/0007386 A1 | 1/2017 | Mason et al. | |
| 2017/0065373 A1* | 3/2017 | Martz | A61C 7/08 433/6 |
| 2017/0105816 A1* | 4/2017 | Ward | A61C 7/146 433/6 |
| 2017/0135792 A1* | 5/2017 | Webber | A61C 7/146 |
| 2017/0135793 A1* | 5/2017 | Webber | A61C 7/08 433/6 |
| 2017/0165032 A1 | 6/2017 | Webber et al. | |
| 2017/0319296 A1 | 11/2017 | Webber et al. | |
| 2018/0153648 A1 | 6/2018 | Shanjani et al. | |
| 2018/0153733 A1 | 6/2018 | Kuo | |
| 2018/0168776 A1 | 6/2018 | Webber | |
| 2018/0353264 A1 | 12/2018 | Riley et al. | |
| 2018/0360567 A1 | 12/2018 | Xue et al. | |
| 2018/0368944 A1 | 12/2018 | Sato et al. | |
| 2019/0000592 A1 | 1/2019 | Cam et al. | |
| 2019/0000593 A1 | 1/2019 | Cam et al. | |
| 2019/0021817 A1 | 1/2019 | Sato et al. | |
| 2019/0029775 A1 | 1/2019 | Morton et al. | |
| 2019/0046297 A1* | 2/2019 | Kopelman | A61C 19/003 |
| 2019/0069975 A1 | 3/2019 | Cam et al. | |
| 2019/0099129 A1 | 4/2019 | Kopelman et al. | |
| 2019/0105130 A1* | 4/2019 | Grove | A61C 7/002 |
| 2019/0125494 A1 | 5/2019 | Li et al. | |
| 2019/0125497 A1 | 5/2019 | Derakhshan et al. | |
| 2019/0152152 A1 | 5/2019 | O'Leary et al. | |
| 2019/0175304 A1 | 6/2019 | Morton et al. | |
| 2019/0231477 A1 | 8/2019 | Shanjani et al. | |
| 2019/0262101 A1 | 8/2019 | Shanjani et al. | |
| 2019/0298494 A1 | 10/2019 | Webber et al. | |
| 2019/0314119 A1 | 10/2019 | Kopelman et al. | |
| 2019/0338067 A1 | 11/2019 | Liska et al. | |
| 2020/0000553 A1 | 1/2020 | Makarenkova et al. | |
| 2020/0086553 A1 | 3/2020 | Mojdeh et al. | |
| 2020/0100864 A1 | 4/2020 | Wang et al. | |
| 2020/0100865 A1 | 4/2020 | Wang et al. | |
| 2020/0100866 A1 | 4/2020 | Medvinskaya et al. | |
| 2020/0100871 A1 | 4/2020 | Wang et al. | |
| 2020/0155276 A1 | 5/2020 | Cam et al. | |
| 2020/0188062 A1 | 6/2020 | Kopelman et al. | |
| 2020/0214598 A1 | 7/2020 | Li et al. | |
| 2020/0214801 A1 | 7/2020 | Wang et al. | |
| 2020/0390523 A1 | 12/2020 | Sato et al. | |
| 2021/0078357 A1 | 3/2021 | Venkatasanthanam et al. | |

FOREIGN PATENT DOCUMENTS

| | | | |
|---|---|---|---|
| FR | 2918556 A1 * | 1/2009 | A61C 7/146 |
| WO | WO-2006096558 A2 * | 9/2006 | A61C 9/002 |
| WO | WO-2015193710 A1 * | 12/2015 | A61C 7/002 |
| WO | WO-2017194916 A1 * | 11/2017 | A61C 7/002 |
| WO | WO-2017198640 A1 * | 11/2017 | A61C 5/007 |
| WO | WO-2018232113 A1 * | 12/2018 | A61C 7/002 |

* cited by examiner

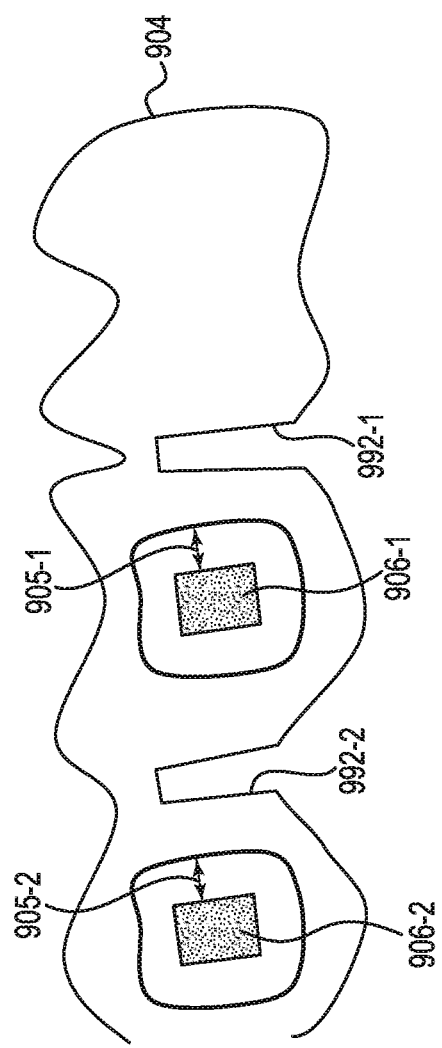

DEVICES, SYSTEMS, AND COMPUTER-IMPLEMENTED METHODS FOR DENTAL ATTACHMENT TEMPLATES

CROSS REFERENCE TO RELATED APPLICATION

This application claims priority to U.S. Provisional Patent Application No. 62/670,520, filed on May 11, 2018, which is incorporated herein by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

FIELD

The technical field relates to devices, systems, and computer-implemented methods for forming and placing attachments for use with dental appliances, and more particularly to the design, manufacture, and use of dental attachment templates for use with orthodontic devices.

BACKGROUND

Dental treatments involve restorative and/or orthodontic procedures to improve the quality of life of a patient. For example, restorative procedures may be designed to implant a dental prosthesis (e.g., a crown, bridge, inlay, onlay, veneer, etc.) intraorally in a patient. Orthodontic procedures may include repositioning misaligned teeth and changing bite configurations for improved cosmetic appearance and/or dental function. Orthodontic repositioning can be accomplished using positioning appliances. Such appliances may utilize a shell of material having resilient properties, referred to as an "aligner," that generally conforms to a patient's teeth but is slightly out of alignment with a current tooth configuration. Placement of such an appliance over the teeth may provide controlled forces in specific locations to gradually move the teeth into a new configuration. Repetition of this process with successive appliances in progressive configurations can move the teeth through a series of intermediate arrangements to a final desired arrangement. Such systems typically utilize a set of appliances that can be used serially such that, as the teeth move, a new appliance from the set can be implemented to further move the teeth.

Such appliances may work in conjunction with attachments placed on teeth. Attachments can be fastened to one or more teeth, for example, via adhesive, direct or indirect bonding, and/or or other techniques, and can be used in conjunction with the shape of an appliance to impart repositioning and/or anchor forces to a patient's teeth. The same attachments may be utilized with multiple appliances. Or, attachments may be added, removed, or replaced with other attachment shapes that may impart different force characteristics than a previous appliance and attachment combination (e.g., appliance and one or more attachments).

Sometimes, an orthodontic treatment plan may use attachments that have complex shapes to rotate, translate, intrude, and/or extrude teeth. An orthodontic treatment plan may also call for attachments to be placed at locations on a patient's teeth that are difficult to access by patients and/or dental practitioners. Many existing techniques make it hard to form attachments with complex shapes and/or place attachments at difficult-to-access locations. Additionally, current techniques make it hard to facilitate formation and/or placement of attachments by practitioners with less training and/or expertise than orthodontists or dentists.

SUMMARY

Described herein are dental attachment placement apparatuses and methods of their use. The apparatuses, referred to herein as dental attachment placement templates (or "templates"), can be used to position one or more attachments to the tooth surfaces. The attachment(s) can be configured to cooperate with an aligner to apply an alignment force to a patient's dental arch according to an orthodontic treatment plan. An inner surface of the template can be designed to complement a portion of the patient's dental arch to place the attachments at predetermined locations on the patient's teeth. The template can include one or more cavities for molding the shape of the attachments. Once placed on a patient's dental arch, an attachment material in a fluid state may be introduced to the cavity(ies) of the template via one or more holes in the template, followed by curing of the attachment material. After the attachment(s) is/are bonded to the tooth/teeth, the template can be removed from the patient's mouth.

The apparatuses described herein may provide more flexibility for a dental professional compared to other dental placement apparatuses. For example, since the attachment material may be applied after the template is positioned on the patent's teeth, the dental professional may choose the type of the attachment material at the dental office. In some cases, the dental professional may choose one or more attachment materials based on specific needs according to the orthodontic treatment plan. Further, the dental professional can adjust the amount of attachment material by controlling the flow of the attachment material into the cavity(ies). The dental professional may also be able to adjust the location of the attachment(s) on the tooth/teeth, for example, by pressing on and/or slightly shifting the template while on the patient's teeth before or during the injection and/or curing processes. In this way, the professional may be able compensate for dimensional inconsistencies in the template, resulting in a more precise attachment location and/or a better bond between the attachment and the tooth surface. The template may also allow the professional to form attachments having shapes that are difficult to form using other dental placement templates. The templates described herein can include a number of features that may provide these and other advantages.

According to some embodiments, the template includes a first (e.g., outer) surface configured to interface with an interior portion of a patient's mouth, and a second (e.g., inner) surface opposite the first surface configured to register with the patient's dental arch. Registering can include placing the template on the dental arch such that a shape of the inner surface matches with a corresponding shape of one or more tooth surfaces. Thus, in some cases, the second surface has a shape corresponding to a shape of at least a portion of the patient's dentition. The second surface can include a cavity configured to hold an uncured attachment material to a tooth surface, such as a facial surface of the tooth. The cavity can define a molding surface that is configured to shape the uncured attachment material. The template can also include one or more holes that provides access to the cavity from the first surface of the template. The hole(s) may include an injection hole configured for injecting the uncured attachment material in a flowable state into the cavity. The injection hole(s) can be sized and shaped to allow an attachment material in a flowable state to flow into the cavity. In some cases, the hole(s) include a window configured to allow light to shine though for curing the attachment material in the cavity. In some embodiments, the hole(s) has a predetermined size. In a particular embodiment, the hole(s) has a cross section diameter at the second surface of template of at least about 1 mm$^2$.

Described herein are methods of forming and attaching the dental attachment(s) to a patient's tooth/teeth using the template. According to some embodiments, methods of forming an attachment include placing the template on the dental arch of a patient such that an inner surface of the template registers with one or more tooth surfaces of the dental arch. The inner surface has a cavity adjacent a crown surface of a tooth and a hole that provides access to the cavity from an outer surface of the template. Methods can also include injecting an attachment material in a flowable state into the cavity via the hole within the template such that the attachment material contacts the crown surface of the tooth. The cavity may be within an attachment region of the template having a prescribed wall thickness to resist deformation during the injection process. In some cases, the wall thickness of the attachment region may be at least about 0.5 mm (e.g., from about 0.5 mm to about 2.0 mm). In some instances, the wall thickness of the attachment region is thicker than surrounding walls. Since the attachment material may be injected into the cavity mold after the template is placed on the dental arch, the dental professional can control different aspects of the attachment forming process. For example, the professional may choose the type of attachment material, sometimes choosing multiple attachment materials. The dental professional may also control the amount of material injected into the cavity by, for example, adjusting an injection pressure. This flexibility may also allow the attachment to be formed on tooth surface locations that are difficult to access using traditional attachment placement techniques. In some cases, the template includes a vent hole that allows air and/or excess uncured attachment material to flow out of the cavity during the injecting. Methods can further include bonding the attachment on the crown surface of the tooth by curing the attachment material on the tooth by shining light on the attachment material in the cavity. The light may be shone through the hole and/or through a transparent portion of the template.

Methods can also include removing the template from the dental arch after the attachment is sufficiently cured and bonded to the tooth. The resultant attachment on the tooth can have shape corresponding to the shape of the cavity mold of the template. Some orthodontic treatment plans require the use of attachments with shapes that may make it difficult to remove the template. Such attachments may include brackets, braces, hooks or other features that may have non-symmetric shapes, overhangs, undercuts and/or sharply angled edges, which may be difficult to maneuver the template during removal. To address these issues, in some embodiments, the methods include bending the template along one or more compliant regions of the template, such as slits in the template. In some embodiments, removing the template includes breaking the template using a tool or breaking the template at one or more scores in the template. Methods may additionally include placing an aligner on the dental arch of the patient such that the aligner interacts with the attachment to apply one or more forces in a predetermined direction on the dental arch.

Described herein are methods of forming the dental attachment templates using computer modeling techniques. According to some embodiments, methods of forming the attachment template include placing an attachment on a surface (e.g., crown surface) of a tooth of a digital dental model. The digital dental model may correspond to, or be based on, a scan of a patient's dentition. Methods can also include creating a digital attachment template from the digital dental model including the attachment on the surface of the tooth of the digital dental model, where the attachment forms a cavity on an inner side of the digital attachment template. Methods can further include creating one or more holes in the digital attachment template that provides access for a flowable attachment material into the cavity. Creating the one or more holes may involve contacting or overlapping various digital shapes on the digital attachment template, which can be used to cut the one or more holes. For example, a cut shape may be place on the digital attachment template and subtracted from the digital attachment template. In some cases, the one or more holes may be configured to act as windows that allow light to shine through to the cavity. For example, forming the hole(s) can include forming a window that defines an area of the light cast onto the flowable attachment material. The one or more holes may have a predetermined size; for example, have a cross-sectional area from about 1 square millimeters (mm$^2$) to about 4 mm$^2$. Creating the one or more holes may involve forming an injection hole for the flowable attachment material to be injected into the cavity. Creating the hole(s) may further include forming a vent hole that allows excess uncured attachment material or air to flow out of the cavity during the injecting of attachment material.

Methods of forming the dental attachment templates may also include three-dimensional printing the attachment template based on the digital attachment template. Three-dimensional printing can provide some advantages over other manufacturing techniques. For example, some attachments may have non-symmetric shapes, overhang or undercut regions, sharply angled features and/or enclosed areas, which may be difficult to form using other manufacturing techniques. Features such as slits and score marks may also be formed more easily using three-dimensional printing.

These and other features and advantages of the dental attachment placement templates are described herein.

BRIEF DESCRIPTION OF THE DRAWINGS

Novel features of embodiments described herein are set forth with particularity in the appended claims. A better understanding of the features and advantages of the embodiments may be obtained by reference to the following detailed description that sets forth illustrative embodiments and the accompanying drawings.

FIG. 9 illustrates an attachment template body for the placement of one or more attachments on one or more of a patient's teeth including slits according to a number of embodiments of the present disclosure.

DETAILED DESCRIPTION

Figure 1:
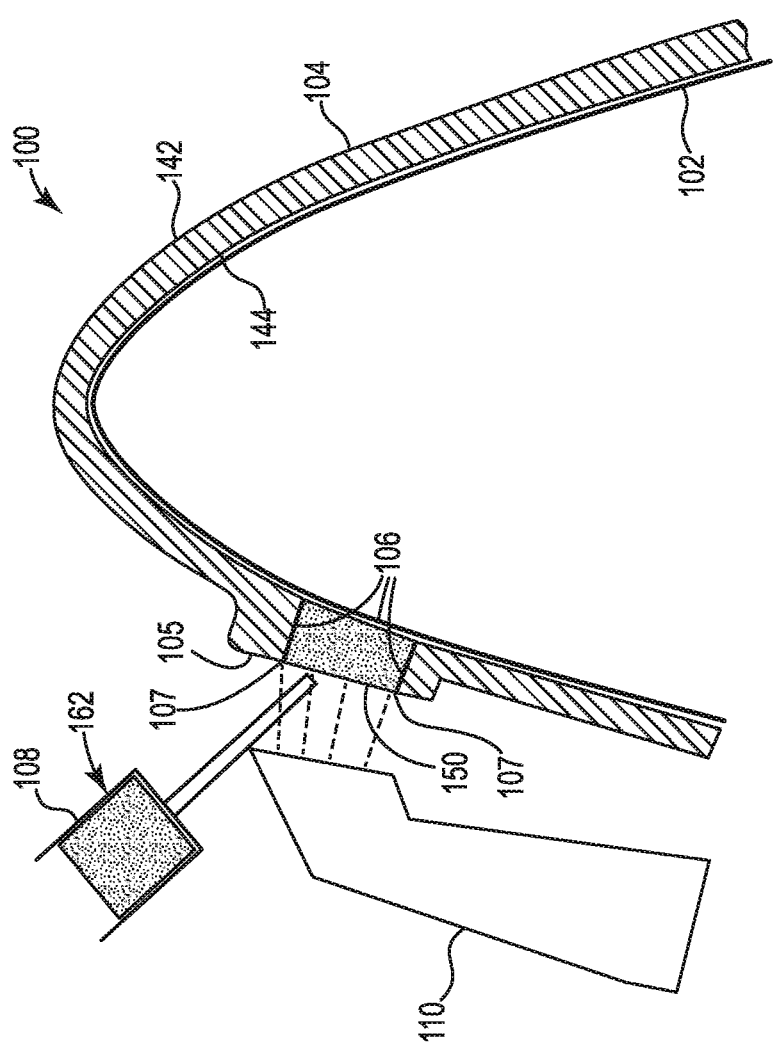
FIG. 1 illustrates a three-dimensional printed attachment template, an attachment material delivery device, and a light source according to a number of embodiments of the present disclosure.

The implementations herein are highly advantageous over thermoformed attachment templates that may limit the complexity of the shape(s) and/or position(s) of attachments. The implementations herein may also allow for the design and/or use of attachment templates that are more rigid and/or thicker than thermoformed attachment templates. The implementations of attachment templates have less manufacturing steps than thermoformed attachment templates.
3D Printed Attachment Templates and Systems/Methods for Making and Using the Same The present disclosure describes examples of methods, devices, and systems for placing and forming attachments for use with dental appliances using three-dimensionally printed attachment templates. The techniques described herein allow skilled and/or unskilled dental professionals, as well as lay people to place dental attachments on teeth. Dental attachments formed and/or placed according to the techniques herein may have complex shapes not otherwise possible and may be placed at locations that were difficult to reach with conventional techniques. In some implementations, an attachment template is disclosed. An "attachment template," (also referred to as a "template") as used herein, may include a device configured to facilitate formation and/placement of attachments on a patient's teeth. An "attachment," or "dental attachment," as used herein, may refer to a structure attached (e.g., through adhesion, bonding, etc.) to a patient's teeth that, in conjunction with a device (e.g., an aligner) cooperates to facilitate transfer of positioning forces to the patient's teeth.

In some implementations, an attachment template may include a body with a first surface that is configured (e.g., shaped) to interface with cheeks, gums, or other interior portions of a patient's mouth. The body may be formed of a plastic material such as a flowable and/or packable composite material. In some implementations, the body may comprise a three-dimensionally (3D) printed body that is formed by 3D printing techniques. The body may but need not allow light to pass through. As examples, the body may be translucent or opaque; in some implementations, the body may be transparent to visible light as well. A second surface of the body may be configured (e.g., shaped) to receive a patient's teeth through one or more cavities that have attachment molds, which as used herein, may refer to specific portions of a cavity shaped to form dental attachments when attachment material is placed and cured therein.

In some implementations, the cavities may receive one or more of the patient's teeth. As noted herein, attachment molds may include one or more openings (e.g., windows, slits, etc.) that allow a dental technician to place attachment material inside. The openings may allow attachment material in an attachment mold to be exposed to curing radiation (e.g., light) so that the attachment material can be cured into an attachment(s). As noted herein, the attachment molds may form a variety of shapes, including complex shapes, such as rectangles, ellipsoids, morphed shapes, hooks, buttons, and/or donut shapes. The attachments formed by the attachment molds may allow for the application of a variety of orthodontic repositioning forces to be applied to the patient's teeth, particularly when such attachments are used in conjunction with aligners. For example, a first aligner may be configured to interact with one or more attachments to apply at least a first force in a first direction. A subsequent second aligner may be configured to interact with one or more attachments to apply at least a second force in a second direction. A third, fourth, fifth or more aligners may be configured to interact with the one or more attachments in accordance with the treatment plan.

Embodiments of the present disclosure provide methods, devices, and systems that can aid in the forming and placement of attachments. For example, in one embodiment, an attachment template for forming and placing attachments used in moving teeth of a patient can include a three-dimensional printed attachment template body having a first surface shaped to conform to contours of exterior surfaces of one or more teeth of a patient. The body can include a portion of the first surface that provides a cavity to form the exterior surfaces of an attachment. The attachment can be attached to and protruding from the exterior surfaces of the one or more teeth. The cavity can include an opening for insertion of uncured attachment material into the cavity.

The attachment template body can be formed using a variety of three-dimensional printing technologies. For example, the attachment template body can be three-dimensionally printed via fused deposition modeling (FDM), stereolithography (SLA), or selective laser sintering (SLS). The contours of the exterior surfaces of the one or more teeth of the patient can be scanned and used to create the three-dimensionally printed attachment template body. In some embodiments, the first surface of the body can be shaped to conform to the facial (e.g., buccal) and/or occlusal surfaces of the teeth of the patient.

The attachment can be one or more shapes. For example, the attachment can be, but is not limited to, a rectangle, ellipsoid, morphed, hook, button, or donut shape. The attachment can be used in a variety of treatments, including AP correction and extrusion treatment, for example. The attachment can be formed by injecting the uncured attachment material into the cavity of the attachment template body via the opening. The cavity can include a vent to allow air to flow from the cavity. The vent can prevent air bubbles from forming in the attachment.

In some embodiments, the attachment template body can include a second cavity. The second cavity can be used at a different treatment stage than the first cavity. The attachment template body can also include slits. The slits can be between each crown of the one or more teeth. The slits can be used for flexibility of the attachment template body when worn by the patient. The slits can also be used for allowing the body to be split into a number of pieces at each of the slits. Splitting the body could allow a number of attachments to be printed at once and used at different times during treatment.

A portion of the body of the attachment template can be made of non-light transmissive material, for example, nylon. The opening can permit light to enter the cavity to cure the attachment material where a portion of the body is made of non-light transmissive material. In some embodiments, a portion of the body can permit light to enter to cure the attachment material by being made of a light transmissive material. In some examples, a blue light can be used to cure the attachment material. The uncured attachment material can be exposed to a light from 20 to 40 seconds, for example. Non-visible light or ultraviolet (UV) light may also be used to cure the attachment material. For example, the light used to cure the attachment material can have a wavelength of 400 nanometers to 500 nanometers. The light can come from one or more types of light sources (e.g., light source 110 in FIG. 1), for example, tungsten halogen, light-emitting diode (LED), plasma, arc curing, or laser.

In the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2. Further, as used herein, the designators "M", "N", and "P", with respect to reference numerals in the drawings, indicate that any number of the particular feature so designated can be included.

As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present disclosure and should not be taken in a limiting sense.

One or more systems, methods, and computer-readable media for designing attachment templates are disclosed herein. Implementations may involve creating a 3D surface model of a virtual attachment formation template with attachment molds and 3D printing an attachment template from the 3D virtual surface model. In some implementations, one or more teeth of a patient may be identified for treatment. A virtual representation of the one or more teeth may be gathered. A "virtual representation of teeth," as used herein, may include a data structure that allows teeth to be visualized or otherwise represented on a computing device.

In some implementations, virtual representation of teeth may include a depiction of teeth at the beginning, end, and/or an intermediate stage of an orthodontic treatment plan, and may involve data relating to size(s), shape(s), position(s), etc. of those teeth at those stages. An orthodontic treatment plan may, but need not, be accessed, and one or more positional force systems may, but again, need not, be gathered from the orthodontic treatment plan. An "orthodontic treatment plan," as used herein, may include a computer-implemented plan to move a patient's teeth from one position/orientation to another. An "orthodontic treatment plan" may include beginning, end, and/or intermediate stage(s), and may be implemented through a set of incremental aligners that are affixed to a patient's teeth and/or attachments thereon. A "positional force system," as used herein, may include a set of force(s) and/or torque(s) that are applied to a patient's teeth as part of an orthodontic treatment plan. A positional force system may be implemented through a set of incremental aligners that are affixed to a patient's teeth and/or attachments thereon.

In some implementations, virtual representations of one or more attachments are gathered. The specific attachments to be modeled may be known in some implementations or may be inferred from an orthodontic treatment plan in various implementations. The virtual representations may include virtual rendering(s) of the attachments and may include virtual size(s), shapes, contours, etc. that facilitate visualization of physical properties of the attachments. The virtual representations may include positional data related to the specific locations and/or orientations the attachments are to reside over the patient's teeth. One or more virtual openings on the virtual representations of the attachments may be identified. A "virtual opening," as used herein, may include a virtual depiction of an opening in an attachment, and may comprise size(s), shape(s), orientations, contour(s), etc. of an opening to be formed in an attachment template in order to receive attachment material and/or cure the attachment material using a curing radiation source. A virtual 3D surface model of an attachment template using the virtual representation of the one or more teeth, the virtual representations of the one or more attachments, and the one or more virtual openings may be created. Instructions to 3D print the attachment template using the 3D surface model of the attachment template may be provided.

One or more systems and methods for forming attachment templates are disclosed herein. In some implementations, a virtual 3D surface model of an attachment template is gathered. The virtual 3D surface model may include first virtual representations of one or more attachments used in conjunction with one or more aligners as part of an orthodontic treatment plan, and the virtual 3D surface model may further include one or more virtual openings identified on the virtual representations of the one or more attachments. The one or more virtual openings may correspond to openings for the one or more attachments to receive an injectable material. Instructions to 3D print an attachment template using the virtual 3D surface model of the attachment template may be provided.

A method of forming attachments using attachment templates are disclosed herein. Methods may involve placing over one or more teeth of a patient an attachment template that comprises: a body; a first surface shaped to interface with the cheeks of the patient; a second surface shaped to interface with a facial (e.g., buccal) surface of the one or more teeth of the patient, the second surface having one or more cavities configured to form one or more attachment molds. As noted herein, in some implementations, the cavities may receive one or more of the patient's teeth as well. Each of the one or more attachment molds may be configured to correspond to an attachment shape and an attachment location of one or more attachments used in an orthodontic treatment plan on the one or more teeth. Each of the one or more attachment molds may have an opening configured to expose material within the attachment mold to a light source. Attachment material may be placed into the one or more attachment molds. The attachment material may be cured within the one or more attachment molds by shining curing radiation (e.g., a light) through the opening for a curing time.

Example Structures

FIG. 1 illustrates a three-dimensional printed attachment template 100, an attachment material delivery device 162, and a light source 110 according to a number of embodiments of the present disclosure. In the embodiment shown in FIG. 1, the attachment template 100 can include a body 104 having a first surface 142 and a second surface 144, and a cavity 106 having one or more openings (designated by 107 indicating a perimeter of an opening), which may also be referred to as one or more holes. The one or more openings 107 can provide access to the cavity 106. The second surface 144 may correspond to an inner surface that contacts the patent's dental arch (e.g., teeth and/or gums). The first surface 142 may correspond to an outer surface of the template that may be directly accessible by the lips, tongue and/or a dental practitioner.

The body 104 may include a structure formed of a 3D printed material and configured to receive a patient's teeth 102. The body 104 may be formed of a packable and/or flowable composite and may comprise material that is translucent or opaque to light. The first surface 142 of the body may be shaped to interface and/or be received by a patient's cheeks or other portion of the patient's mouth. The second surface 144 may be shaped to receive the patient's teeth 102. In the embodiment of FIG. 1, the body 104 is shaped to receive all of the teeth 102 in the upper jaw of a patient. The body 104 can have portions of different thickness, for example portion 105 (shown in FIG. 1 as having a thickness greater than other portions of the body 104).

The cavity 106 may include or be accessible by the one or more openings 107. The opening(s) 107 may be configured (e.g. shaped) to form an attachment mold to receive attachment material 108, for example, in a flowable (e.g., uncured) state. In some embodiments, the attachment material 108 may be injected into the cavity 106 via opening(s) 107 while in a flowable state. The attachment mold may include interior surfaces 106 that are used to form the exterior surfaces of the attachment as the uncured attachment material 108 is cured by a light source 110 (as discussed further herein). In some embodiments, the opening(s) 107 may be configured to expose the contents within the cavity 106 to a source of curing radiation (e.g., light from the light source 110). Thus, the opening(s) 107 may be window(s) for shining light into the cavity 106 and onto the uncured attachment material. In cases where the template 100 is made of a material that opaque to the wavelengths of the light, the size and number of the window(s) may define an area of the light cast into the cavity and onto the uncured attachment material. For instance, the perimeter (e.g., defined by the edges) of the opening(s) can define area of cast light. In some embodiments, a cross-sectional shape of the window(s) is at least as wide as a largest width of the cavity 106. When the uncured attachment material is exposed to the curing radiation, the attachment material within the cavity 106 can cure (e.g., harden) into an attachment. In some embodiments, a cross-sectional area of the opening(s) is based at least in part on a curing property of the attachment material and an energy property of the light. The curing properties of the attachment material can include the curing wavelength, light intensity and/or curing time of the attachment material, as described herein. In some embodiments, the opening(s) have a cross-sectional area ranging from about 1 square millimeters ($mm^2$) to about 4 $mm^2$.

The cavity 106 can be sized and/or shaped to hold a specific amount of attachment material 108 to form the desired shaped attachment needed for the treatment plan to treat the orthodontic conditions of a patient. This not only includes an amount sufficient to form the exterior attachment surface shapes defined by the interior surfaces of the cavity 106, but also sufficient material to form an affixation surface that can be used to affix the attachment to the surface of a tooth. In some embodiments, the attachment material 150 is bonded to the surface of the surface of the tooth during the curing process. In some embodiments, the attachment material 150 includes multiple materials. For example, a first material (e.g., within the cavity 106) may be used to bond the attachment to the tooth surface and a second material (e.g., different than the first material) may be used to form an outer surface shape of the attachment. The first and second materials may have different properties, such as different bonding properties, flexibility or rigidity (e.g., elastic modulus) and/or surface texture when in cured form. Once the attachment material 150 is cured and bonded to the one or more teeth, the template 100 can be removed from the patient's dental arch. The cured (e.g., hardened) attachment material can retain the shape of the cavity 106 on the tooth.

The affixation surface can be a flat surface or can have a shape that matches that of the surface of the tooth to which the affixation surface is to be affixed. A matching surface to that of the tooth can be beneficial as it may allow for a stronger affixation of the attachment and thereby the attachment can be used with higher forces when used in combination with a dental appliance. By injecting the attachment material while in fluid form onto the tooth, the attachment material may be allowed to better conform to the tooth surface, and thereby provide a more conforming affixation surface, compared to techniques where the attachment material contacts the tooth in non-fluid form.

Additionally, as discussed herein, some embodiments may use a bonding material to affix the attachment to the surface of a tooth. When sizing the cavity 106, the size can be calculated to include space for this bonding material, as noted further herein.

Further, in some embodiments, the cavity 106 may have a release material (e.g., lubricant, thin film, coating, etc.) provided between the surfaces of the cavity 106 and the uncured attachment material 108. Such release material may be beneficial in separating the attachment from the cavity 106. Any suitable release material may be used to accomplish such functionality. In such embodiments, the size of the cavity 106 may be calculated to accommodate the release material based on an estimate of the amount of space needed to accommodate the release material.

In various embodiments, the cavity 106 may be provided to the user with no attachment, release, or bonding material therein (e.g., may be added by the treatment professional, patient, or other user), may be provided with the uncured attachment material 108 therein, or may be provided with release and/or the bonding material provided in the cavity 106 with the uncured attachment material 108.

The sizing of the cavity 106 can be determined based on whether a release material is to be used and/or whether a bonding material is going to be used to affix the attachment to the tooth rather than the attachment being affixed directly to the tooth surface. As discussed above, the size of the cavity 106 attributable to the release material can be calculated, for example, based on amount of release material to be used and the volume of the type of release material to be used, among other variables.

One or more of the attachment surfaces will be used to interact with one or more surfaces of the dental appliance and, therefore, the shape, position, and orientation of the one or more surfaces that interact with the dental appliance is important. Accordingly, the attachment template 100 is used to more accurately shape, position, and orient the attachment with respect to the tooth surface to which it is to be attached.

In some implementations, a first surface of an attachment may be utilized through interaction with one or more surfaces of a dental appliance while a second surface of the attachment is not utilized. Then, later in treatment, the second surface of the attachment is either additionally or alternatively used to interact with one or more surfaces of a dental appliance. In this manner, an attachment can be designed to provide more than one function during the treatment of the patient based on use of different surfaces provided on the attachment.

As shown in FIG. 1, the shape of any of the attachment templates discussed herein can be designed to approximate the shape of one or more teeth of the patient. The more accurately the shape of the attachment template 100 approximates the shape of one or more of the surfaces of a tooth 102 of a patient, the more accurate the placement of the attachment can be. This is because each tooth surface has unique characteristics (e.g., contours, edges, peaks, valleys, etc.) and if a surface of the attachment template 100 closely approximates these characteristics, then the surface of the tooth and the surface of the attachment template 100 can be closely mated to each other (i.e., characteristics are aligned when the attachment template is placed over the tooth) and this results in more accurate placement of the attachment on the surface of the tooth.

The more characteristics on a tooth that are approximated on the attachment template 100, the more accurate the placement of the attachment can be. The more tooth surfaces that are approximated, the more accurate the placement can be. Accordingly, an embodiment, as shown in FIG. 1, can be very accurate if the shapes of the teeth of the jaw of the patient have been closely approximated by the surfaces of the attachment template body 104. Three-dimensional printing of attachment templates 100 can be more accurate than previously used manufacturing techniques in approximating the surfaces of the teeth.

For example, a three-dimensional printed attachment template body 104 can have a first surface shaped to conform to contours of exterior surfaces of one or more teeth of a patient 102 and can include a portion of the first surface that provides a cavity 106 to form the exterior surfaces of an attachment that is to be attached to and protruding from the exterior surfaces of one of the one or more teeth 102. In some examples, the cavity 106 can include one or more openings 107 for insertion of uncured attachment material 108 into the cavity 106. The one or more openings 107 can also allow light to enter the cavity to cure the uncured attachment material 108 from a light source 110.

The attachment template body 104 can be formed using a variety of three-dimensional printing technologies. For example, the attachment template body 104 can be three-dimensionally printed via fused deposition modeling (FDM), stereolithography (SLA), or selective laser sintering (SLS). The contours of the exterior surfaces of the one or more teeth 102 of the patient can be scanned and used to create the three-dimensionally printed attachment template body 104. In some embodiments, the first surface of the body can be shaped to conform to the facial (e.g., buccal) and/or occlusal surfaces of the teeth 102 of the patient.

A portion of the body of the attachment template 104 can be made of non-light transmissive material, for example, nylon. The one or more openings 107 can permit light from the light source 110 to enter the cavity 106 to cure the uncured attachment material 108 where a portion of the body 104 is made of non-light transmissive material.

Figure 2:
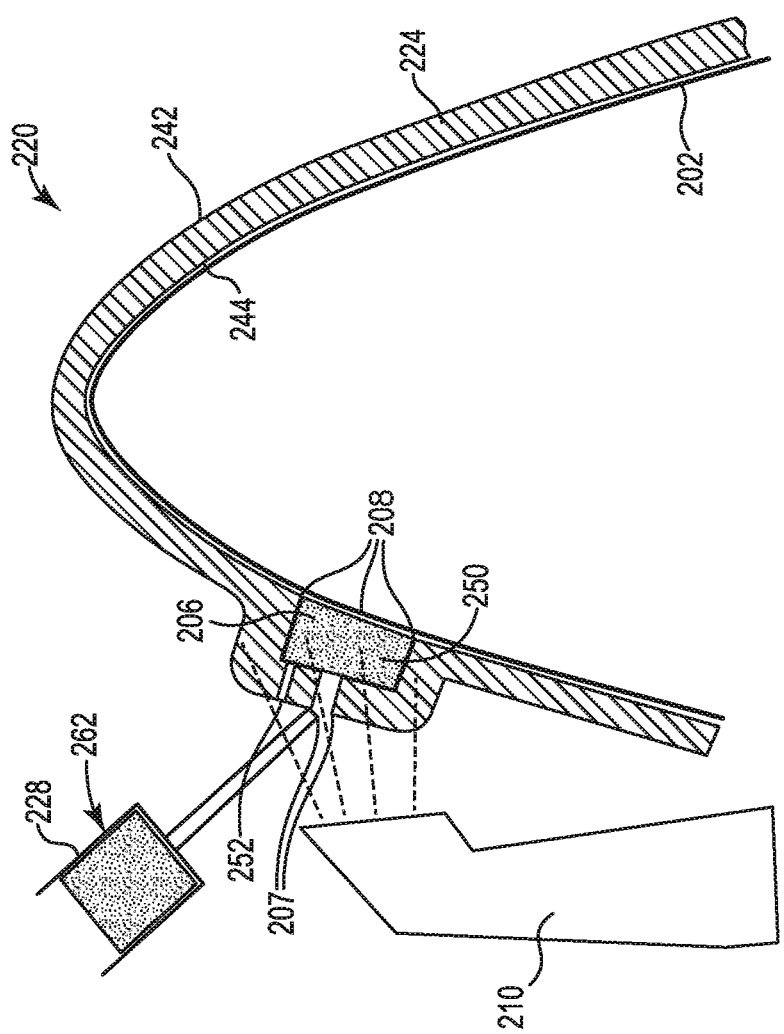
FIG. 2 illustrates a three-dimensional printed attachment template, an attachment material delivery device, and a light source according to a number of embodiments of the present disclosure.

FIG. 2 illustrates a three-dimensional printed attachment template 220, an attachment material delivery device 262, and a light source 210, according to a number of embodiments of the present disclosure.

The body 224 may include a structure formed of a 3D printed material and configured to receive a patient's teeth 202. The body 224 may be formed of a packable and/or flowable composite and may comprise material that is translucent or opaque to light. The first surface 242 of the body may be shaped to interface and/or be received by a patient's cheeks or other portion of the patient's mouth. The second surface 244 may be shaped to receive the patient's teeth 202.

The attachment template 220 includes one or more openings 207 to receive uncured attachment material 228 into a cavity 206 shaped to form an attachment. The cavity 206 has interior surfaces 208 that are used to form the exterior surfaces of the attachment as the uncured attachment material 250 is cured by a light source 210. The cavity 206 may further comprise a vent opening 252 (which may, but need not, be one of the one or more openings 207) to release gases caused by injecting and/or curing attachment material 228 in the cavity 206.

The cavity 206 can be sized to hold a specific amount of attachment material 228 that is sufficient to form the desired shaped attachment needed for the treatment plan to treat the orthodontic conditions of a patient. The cavity can also be sized sufficient to include an affixation material, release material, and/or bonding material, for example.

The attachment template body 224 can have a first surface shaped to conform to contours of exterior surfaces of one or more teeth 202 of a patient. The first surface can include a portion that provides the cavity 206 to form exterior surfaces of the attachment. The attachment can be attached to and protruding from the exterior surfaces of one of the one or more teeth 202.

The cavity 206 can include a vent 252 to allow air to flow from the cavity, and/or any surplus uncured attachment material 228. The vent 252 can be included in the attachment template body 224 to prevent air bubbles from forming in the attachment. Air bubbles in the attachment can result in deformation and/or failure of the attachment, for example.

In some embodiments, a portion of the body 224 can permit light from the light source 210 to enter to cure the attachment material by being made of a light transmissive material (e.g., transparent). For example, a blue light can be used to cure the uncured attachment material 228. The uncured attachment material 228 can be exposed to the blue light or another light from 20 to 40 seconds. Non-visible light or ultraviolet (UV) light may also be used to cure the uncured attachment material 228. For example, the light used to cure the attachment material can have a wavelength of 400 nanometers to 500 nanometers. The light from the light source 210 can be one or more types, for example, tungsten halogen, light-emitting diode (LED), plasma, arc curing, or laser.

Figure 3:
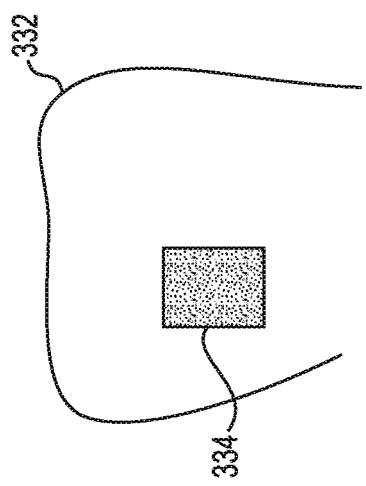
FIG. 3 illustrates a rectangular attachment according to a number of embodiments of the present disclosure.

FIGS. 3-8 illustrate attachments having various shapes according to some embodiments. FIG. 3 illustrates a polygonal (e.g., rectangular prism) attachment according to a number of embodiments of the present disclosure. An attachment formed from the cavity (e.g., cavity 106 in FIG. 1) of the attachment template body (e.g., attachment template body 104 in FIG. 1) can be one or more shapes including a polygonal attachment 334, for example. The shape can be selected based on the treatment plan. The polygonal attachment 334 can be affixed to a tooth 332 to provide one or more surfaces to contact one or more surfaces of a dental appliance during one or more treatment stages. For example, a first surface of the polygonal attachment 334 can be utilized through interaction with one or more surfaces of a first dental appliance while a second surface of the polygonal attachment 334 is not utilized. Then, later in treatment, the second surface of the polygonal attachment 334 is either additionally or alternatively used to interact with one or more surfaces of a second dental appliance.

Figure 4:
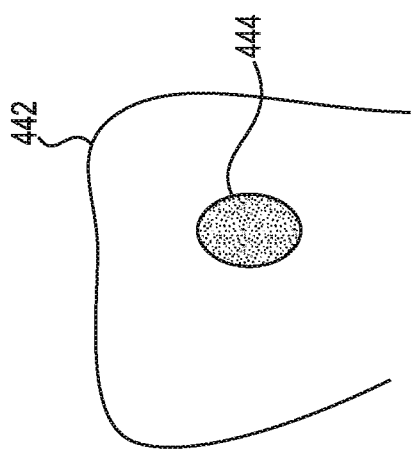
FIG. 4 illustrates an ellipsoid attachment according to a number of embodiments of the present disclosure.

FIG. 4 illustrates an ellipsoid attachment according to a number of embodiments of the present disclosure. An attachment formed from the cavity (e.g., cavity 106 in FIG. 1) of the attachment template body (e.g., attachment template body 104 in FIG. 1) can be one or more shapes including an ellipsoid attachment 444, for example. The shape can be selected based on the treatment plan. The ellipsoid attachment 444 can be affixed to a tooth 442 to provide one or more surfaces to contact one or more surfaces of a dental appliance during one or more treatment stages. For example, a first surface of the ellipsoid attachment 444 can be utilized through interaction with one or more surfaces of a first dental appliance while a second surface of the ellipsoid attachment 444 is not utilized. Then, later in treatment, the second surface of the ellipsoid attachment 444 is either additionally or alternatively used to interact with one or more surfaces of a second dental appliance.

Figure 5:
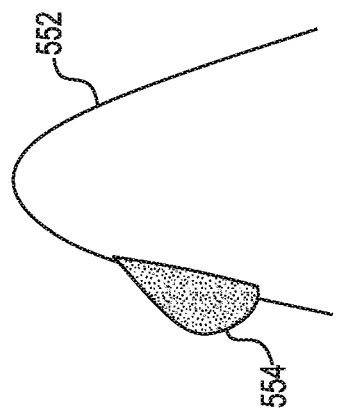
FIG. 5 illustrates a morphed attachment according to a number of embodiments of the present disclosure.

FIG. 5 illustrates a morphed attachment according to a number of embodiments of the present disclosure. An attachment formed from the cavity (e.g., cavity 106 in FIG. 1) of the attachment template body (e.g., attachment template body 104 in FIG. 1) can be one or more shapes including a morphed attachment 554, for example. The shape can be selected based on the treatment plan. The morphed attachment 554 can be affixed to a tooth 552 to provide one or more surfaces to contact one or more surfaces of a dental appliance during one or more treatment stages. For example, a first surface of the morphed attachment 554 can be utilized through interaction with one or more surfaces of a first dental appliance while a second surface of the morphed attachment 554 is not utilized. Then, later in treatment, the second surface of the morphed attachment 554 is either additionally or alternatively used to interact with one or more surfaces of a second dental appliance.

Figure 6:
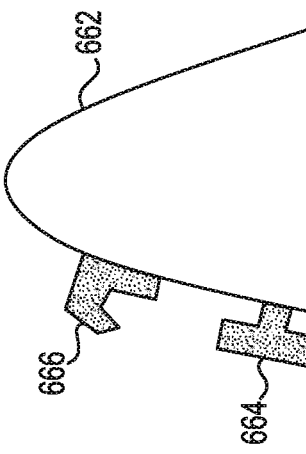
FIG. 6 illustrates hook and button attachments according to a number of embodiments of the present disclosure.

FIG. 6 illustrates hook and button attachments according to a number of embodiments of the present disclosure. An attachment formed from the cavity (e.g., cavity 106 in FIG. 1) of the attachment template body (e.g., attachment template body 104 in FIG. 1) can be one or more shapes including a hook 666 and a button 664, for example. The shapes can be selected based on the treatment plan. The hook 666 and/or button 664 can be affixed to a tooth 662 to provide one or more surfaces to contact one or more surfaces of a dental appliance during one or more treatment stages. For example, a first surface of the hook 666 can be utilized through interaction with one or more surfaces of a first dental appliance while a second surface of the hook 666 is not utilized. Then, later in treatment, the second surface of the hook 666 is either additionally or alternatively used to interact with one or more surfaces of a second dental appliance. Similarly, a first surface of the button 664 can be utilized through interaction with one or more surfaces of a first dental appliance while a second surface of the button 664 is not utilized. Then, later in treatment, the second surface of the button 664 is either additionally or alternatively used to interact with one or more surfaces of a second dental appliance.

Figure 7:
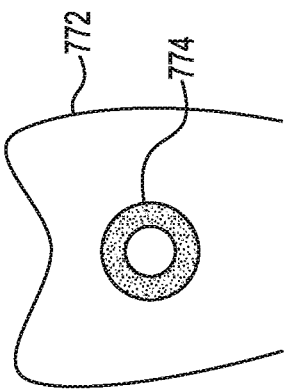
FIG. 7 illustrates a donut attachment according to a number of embodiments of the present disclosure.

FIG. 7 illustrates a donut attachment according to a number of embodiments of the present disclosure. An attachment formed from the cavity (e.g., cavity 106 in FIG. 1) of the attachment template body (e.g., attachment template body 104 in FIG. 1) can be one or more shapes including a donut attachment 774, for example. The shape can be selected based on the treatment plan. The donut attachment 774 can be an affixed to a tooth 772 to provide one or more surfaces to contact one or more surfaces of a dental appliance during one or more treatment stages. For example, a first surface of the donut attachment 774 can be utilized through interaction with one or more surfaces of a first dental appliance while a second surface of the donut attachment 774 is not utilized. Then, later in treatment, the second surface of the donut attachment 774 is either additionally or alternatively used to interact with one or more surfaces of a second dental appliance.

Figure 8:
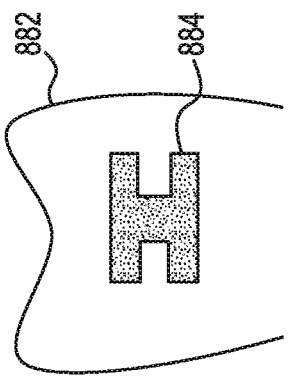
FIG. 8 illustrates a bracket attachment according to a number of embodiments of the present disclosure.

FIG. 8 illustrates a bracket attachment according to a number of embodiments of the present disclosure. An attachment formed from the cavity (e.g., cavity 106 in FIG. 1) of the attachment template body (e.g., attachment template body 104 in FIG. 1) can be one or more shapes including a bracket attachment 884, for example. The shape can be selected based on the treatment plan. The bracket attachment 884 can be affixed to a tooth 882 to provide one or more surfaces to contact one or more surfaces of a dental appliance during one or more treatment stages. For example, a first surface of the bracket attachment 884 can be utilized through interaction with one or more surfaces of a first dental appliance while a second surface of the bracket attachment 884 is not utilized. Then, later in treatment, the second surface of the bracket attachment 884 is either additionally or alternatively used to interact with one or more surfaces of a second dental appliance.

The attachment template can include features that facilitate the attachment forming process and/or removal of the attachment template from the patient's tooth/teeth after the attachment(s) have been cured and bonded to the tooth/teeth. For example, the attachment template can include thicker regions that are resistant to deformation during the injection process. In some cases, the attachment template can include one or more compliant regions that preferentially bend or break to facilitate removal of the attachment template. The compliant regions may include one or more slits, perforations, scored regions, thinner regions and/or regions made of a more compliant material. FIG. 9 illustrates an attachment template including examples of such features.

In the embodiment of FIG. 9, the attachment template body 904 includes a first attachment region having walls with a first thickness 905-1 around a first cavity 906-1. The thickness around the first cavity 906-1 may be chosen, in part, on the material of the attachment template, the size (e.g., volume) of the attachment and/or the injection force. Thicker walls or walls made of a more rigid material are generally more resistant to deformation. In some embodiments, the walls of the attachment region is at least about 0.5 millimeters (mm). In some embodiments, the walls of the attachment region ranges from about 0.5 mm and about 2.0 mm.

In some embodiments, the walls of the attachment region around a cavity may have a different thickness than other regions of the body 904. For example, the regions of the template around the one or more teeth may be thinner to provide more comfort for the patient. It may also be beneficial for regions of the attachment template outside of the attachment region to be relatively thin so that the attachment template may bend (e.g., twist) for easier removal of the attachment template. In some cases, the walls of the attachment region(s) have a greater thickness than a remainder of the body 904. In some instances, the attachment region(s) may be made of a different material than other regions of the body 904. For instance, the attachment region(s) may be made of a more rigid material than a remainder of the body 904.

In some embodiments, where the attachment template includes multiple attachment regions, the walls of the attachment regions may be the same or may vary. For example, the walls of a first attachment region having the first thickness 905-1 that may be the same as, or different than, the walls of a second attachment region having a second thickness 905-2. Differences may depend, in part, on the size (e.g., volume) and shape of the corresponding first cavity 906-1 and second cavity 906-2. Thickness differences may also depend on the type (e.g., viscosity) of attachment material injected into the corresponding cavities. For example, an attachment material having a thicker viscosity may require more force to inject the material into the cavity, and therefore may need a stronger attachment region wall. In some cases, different attachment regions may be made of different materials. For example, the first attachment region 905-1 forming the first cavity 906-1 can be made of the same or different material as the second attachment region 905-2 forming the second cavity 906-2. The second cavity 906-2 can be used at the same and/or a different treatment stage than the first cavity 906-1.

The attachment template of FIG. 9 also includes compliant regions 992-1 and 992-2 to ease removal of the body 904 from the attachments and from the patient's mouth. In some embodiments, the compliant regions 992-1 and 992-2 are slits within the body 904. In some embodiments, the compliant regions 992-1 and 992-2 correspond to perforated regions, scored regions, thinner regions and/or regions made of a more compliant material. In the example of FIG. 9, the compliant regions 992-1, 992-2 can be between the crown of the one or more teeth (e.g., one or more teeth 102 in FIG. 1). In some instances, the compliant regions are within the attachment region(s) (e.g., 905-1, 905-2) of the body 904. The body 904 can be configured to preferentially bend (e.g., twist) at the compliant regions 992-1, 992-2 for easier removal of the body 904 from the patient's mouth. The compliant regions 992-1, 992-2 can be also provide flexibility for placement of the body 904 within the patient's mouth. In some embodiments, the body 904 is configured to preferentially break or split at the compliant regions 992-1, 992-2. Splitting the body may also allow a number of cavities 906-1, 906-2 to be used at different times during treatment.

Example Computer System(s)

Figure 10A:
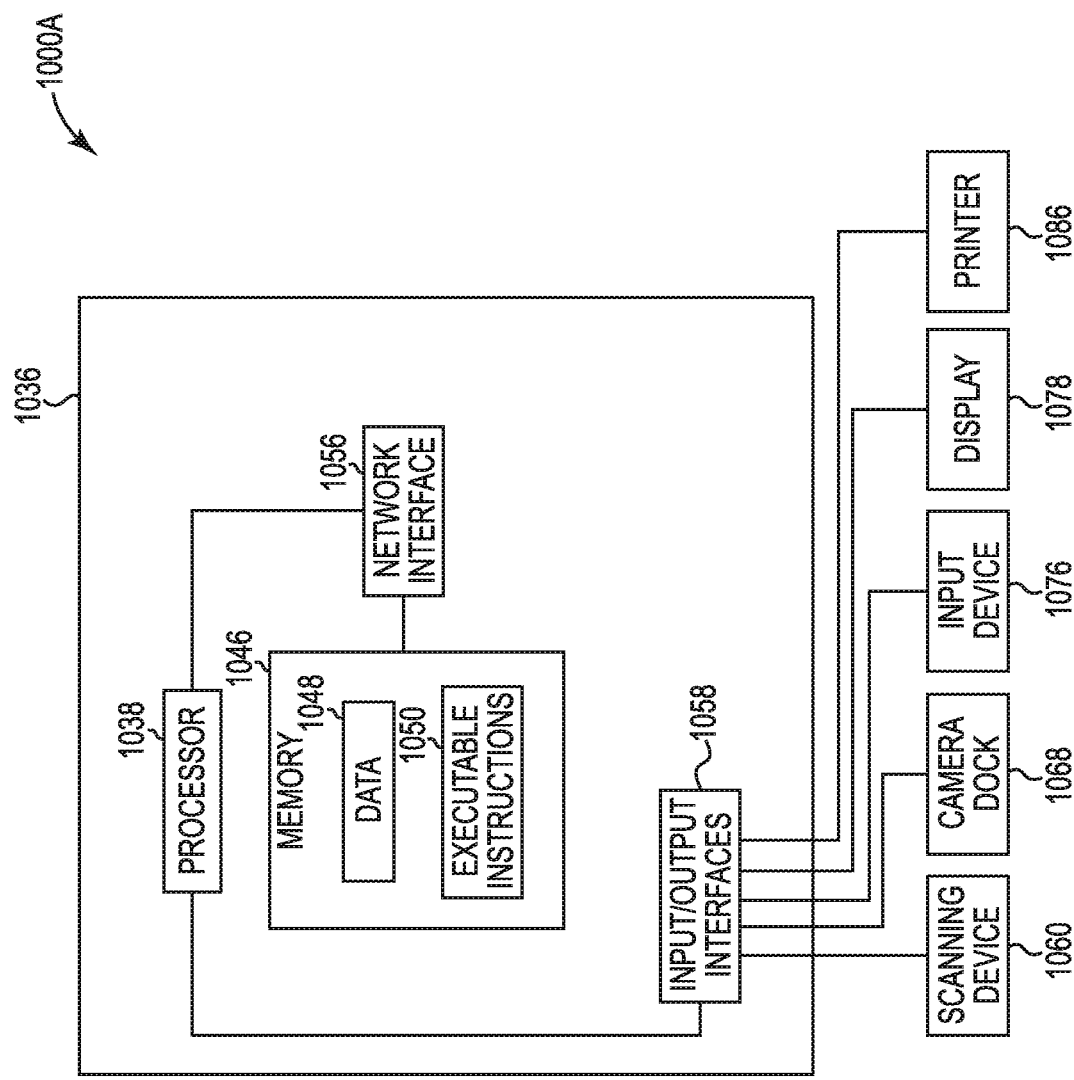
FIG. 10A illustrates a computing system for use in a number of embodiments of the present disclosure.

FIG. 10A illustrates a computing system 1000A for use in a number of embodiments of the present disclosure. For instance, a computing device 1036 can have a number of components coupled thereto. The computing device 1036 can include a processor 1038 and a memory 1046. The memory 1046 can have various types of information including data 1048 and executable instructions 1050, as discussed herein.

The processor 1038 can execute instructions 1050 that are stored on an internal or external non-transitory computer device readable medium (CRM). A non-transitory CRM, as used herein, can include volatile and/or non-volatile memory.

Volatile memory can include memory that depends upon power to store information, such as various types of dynamic random access memory (DRAM), among others. Non-volatile memory can include memory that does not depend upon power to store information.

Memory 1046 and/or the processor 1038 may be located on the computing device 1036 or off of the computing device 1036, in some embodiments. As such, as illustrated in the embodiment of FIG. 10A, the computing device 1036 can include a network interface 1056. Such an interface 1056 can allow for processing on another networked computing device, can be used to obtain information about the patient (e.g., characteristics of the patient's mouth, treatment planning information or data used for creating a treatment plan information about the attachment shape and/or one or more of the templates described herein) and/or can be used to obtain data and/or executable instructions for use with various embodiments provided herein.

As illustrated in the embodiment of FIG. 10A, the computing device 1036 can include one or more input and/or output interfaces 1058. Such interfaces 1058 can be used to connect the computing device 1036 with one or more input and/or output devices 1060, 1068, 1076, 1078, 1086.

For example, in the embodiment illustrated in FIG. 10A, the input and/or output devices can include a scanning device 1060, a camera dock 1068, an input device 1076 (e.g., a mouse, a keyboard, etc.), a display device 1078 (e.g., a monitor), a printer 1086, and/or one or more other input devices. The input/output interfaces 1058 can receive executable instructions and/or data, storable in the data storage device (e.g., memory 1046), representing a virtual dental model of a patient's dentition.

In some embodiments, the scanning device 1060 can be configured to scan a patient's dentition or one or more dental molds of the patient's dentition. In one or more embodiments, the scanning device 1060 can be configured to scan the patient's dentition, a dental appliance, and/or an attachment directly. The scanning device 1060 can be configured to input data into the computing device 1036 which can then be used for treatment planning and/or generating digital 3D models of the patient's dentition. This information can also be used to estimate the forces discussed herein.

In some embodiments, the camera dock 1068 can receive an input from an imaging device (e.g., a 2D or 3D imaging device) such as a digital camera, a printed photograph scanner, and/or other suitable imaging device. The input from the imaging device can, for example, be stored in memory 1046.

The processor 1038 can execute instructions to provide a visual indication of a treatment plan, a dental appliance, and/or one or more attachments on the display 1078. The computing device 1036 can be configured to allow a treatment professional or other user to input treatment goals.

Input received can be sent to the processor 1038 as data 1048 and/or can be stored in memory 1046.

The data 1048 may include a 3D model of an object to be 3D printed by the printer 1086. The 3D model may comprise a mathematical representation of one or more surfaces of the object. The 3D model may have been rendered through automated agents or by an operator through, e.g., the techniques discussed further herein. The 3D model may be stored as a digital model file of a 3D virtual representation of a 3D object to be printed. The digital model file may be formatted according to a variety of formats, such as an Additive Manufacturing File (AMF) (e.g., one that uses sequential layers), an STL file, a fused deposit modeling (FDM) file, etc.

Such connectivity can allow for the input and/or output of data and/or instructions among other types of information. Some embodiments may be distributed among various computing devices within one or more networks, and such systems as illustrated in FIG. 10A can be beneficial in allowing for the capture, calculation, and/or analysis of information discussed herein.

The processor 1038, can be in communication with the data storage device (e.g., memory 1046), which has the data 1048 stored therein. The processor 1038, in association with the memory 1046, can store and/or utilize data 1048 and/or execute instructions 1050 for creating and/or modeling interactions between an attachment and a tooth; interactions between an attachment and one or more appliances; and/or combinations of interactions between one or more attachments, one or more teeth, and/or other structure in the mouth of the patient, and/or one or more appliances for moving teeth; and/or degradation of an attachment; and/or separation of a portion of an attachment to reveal a hidden portion.

The processor 1038, in association with the memory 1046 can, in addition to or alternatively, store and/or utilize data 1048 and/or execute instructions 1050 for creating and/or modeling attachment templates, etch trays, removal trays, attachments, and/or bonding and/or releasable materials, as well as a virtual modeling of such items with or without an appliance for moving teeth, and/or one or more teeth. The virtual model of the template and/or attachments to attach a dental appliance to the teeth of a patient can be used to create a dental appliance, the templates themselves, removal tools, and/or attachments, for instance, as discussed further herein. The processor 1038 coupled to the memory 1046 can, for example, include instructions to cause the computing device 1036 to perform a method including, for example, creating a treatment plan based on a virtual model of a jaw of a patient, wherein the treatment plan includes use of one or more attachments and/or templates or other components on the upper and/or lower jaw of a patient.

In some embodiments, the processor 1038 coupled to the memory 1046 can cause the computing device 1036 to perform the method comprising modeling a virtual dental attachment based on the treatment plan, wherein the virtual dental attachment is constructed to provide one or more forces desired by the treatment plan.

In various embodiments, the processor 1038 coupled to the memory 1046 can cause the computing device 1036 to perform the method comprising creating an attachment template by placing a digital attachment on a crown surface of a tooth of a digital dental model, creating a digital attachment template from the digital dental model including the attachment on the crown surface of the tooth of the digital dental model, creating an opening in the digital attachment template, and three-dimensional printing the attachment template based on the digital attachment template.

Such analysis can be accomplished one or more times for a treatment plan. For example, if a treatment plan has 30 stages, it would be possible to have different attachment configurations for each stage or possibly more, if desired. However, in many instances the attachment type, shape, position, and/or orientation may be changed a few times during the treatment plan.

Through use of virtual modeling, attachments can be virtually tested and the best attachment type, shape, position, and/or orientation can be selected without inconveniencing the patient with trial and error of attachments during treatment. Additionally, use of virtual modeling can also allow for custom design of attachment shapes that will be suitable for a specific patient's needs and/or a specific function within an area of a patient's mouth. From such analysis, different dental attachments and other apparatuses can be created from the virtual dental attachment placement apparatus data that would be utilized to create the attachments needed for the different stages.

Further, the specialized nature of the design of such attachments can also allow the attachments to be made from different materials. In this manner, attachments during a treatment plan or even during one stage can be of one or more different materials that may provide more specialized force distribution than was possible with standard attachments.

The executable instructions 1050 may comprise instructions to transform a 3D model of an object into printable portions that can be printed by the printer 1086. In some implementations, the executable instructions 1050 may comprise instructions to "slice" a 3D model, e.g., to convert the 3D model into a set of thin layers that are to be 3D printed by the printer 1086. In some implementations, the executable instructions 1050 convert a 3D model into a sliced format file (e.g., a G-code file) that can be provided to the printer 1086.

In some implementations, the display 1078 may be configured to display a 2D rendering of a 3D model of an object to be 3D printed. The 2D rendering may have been developed through simulations, projections, mappings, etc. of the 3D model into a 2D space. The display 1078 may further be configured to display user interface elements to allow an operator to interact with a 3D model.

In some embodiments, the printer 1086 can be a three-dimensional or direct fabrication device that can create a dental appliance directly from instructions from the computing device 1036. Embodiments of the present disclosure utilizing such technology can be particularly beneficial for a variety of reasons. For example, such direct manufacture allows for less waste of materials due to less processing steps and increased specialization of the attachment placement structure, attachment materials, and/or other components of the appliances described herein.

The printer 1086 may be configured to use additive manufacturing techniques to print 3D objects using virtual representations of those 3D objects. In some implementations, the printer 1086 join and/or solidify material (e.g., polymeric material) based on instructions from the processor 1038 to create a 3D object. As noted herein, the printer 1086 may receive from the memory 1046 a sliced format file. The printer 1086 may successively add material to a 3D object on a layer-by-layer basis using, e.g., SLA, FDM, etc.

The printer 1086 may print a 3D object at a specified resolution. The resolution of the printer 1086 may describe layer thickness(es) and/or X-Y resolutions in a convenient format, such as dots per inch (dpi) or micrometers (μm).

Figure 10B:
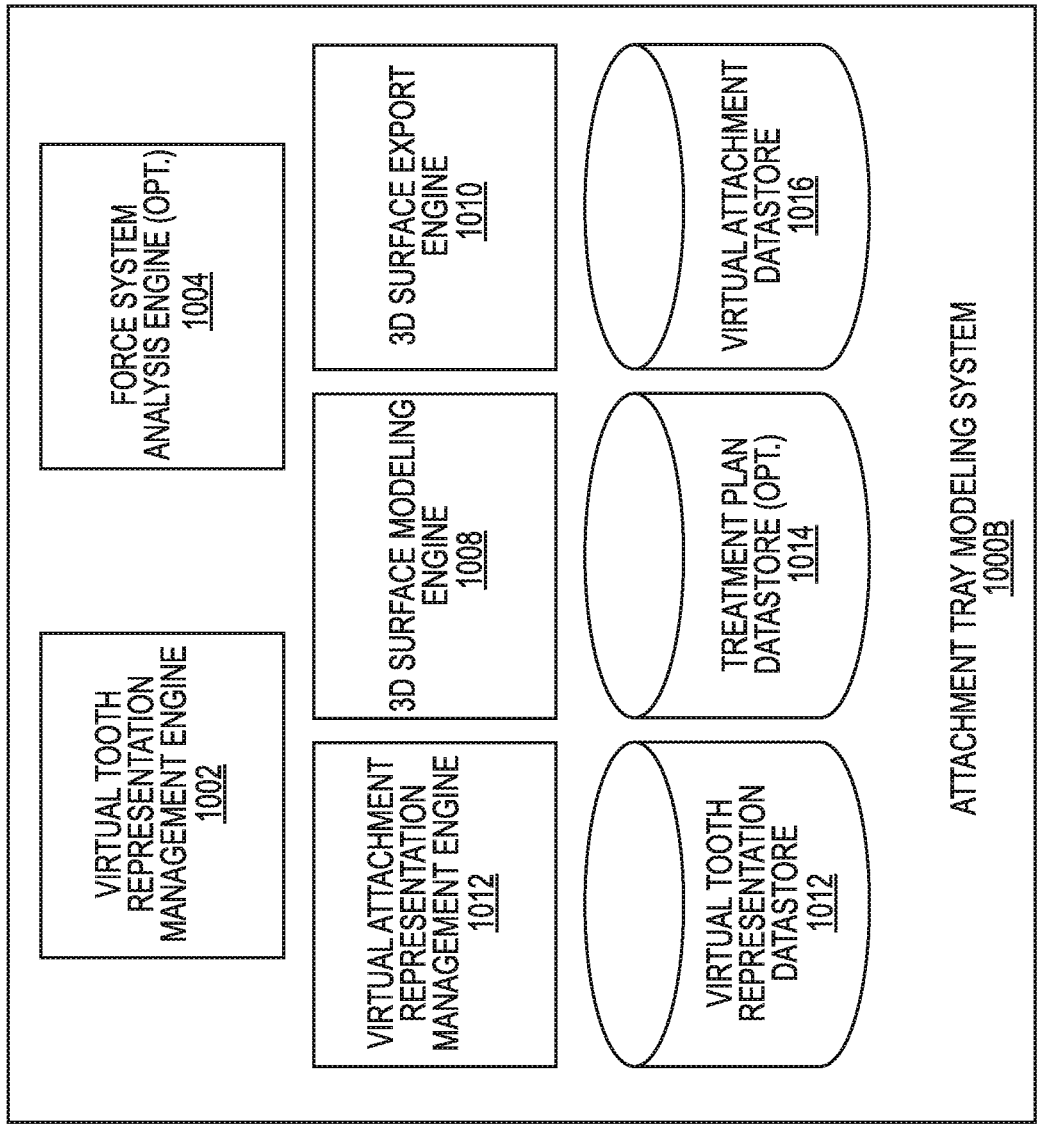
FIG. 10B illustrates an example of an attachment modeling system, according to some embodiments.

FIG. 10B illustrates an example of an attachment modeling system 1000B, according to some embodiments. The attachment modeling system 1000B may include a virtual tooth representation management engine 1002, a force system analysis engine 1004, a virtual attachment representation management engine 1012, a 3D surface modeling engine 1008, a 3D surface export engine 1010, a virtual tooth representation datastore 1012, a treatment plan datastore 1014, and a virtual attachment datastore 1016. One or more modules of the attachment modeling system 1000B may be coupled to one another or to modules not explicitly shown in FIG. 10B.

The attachment modeling system 1000B may include one or more engines and datastores. A computer system can be implemented as an engine, as part of an engine or through multiple engines. As used herein, an engine includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor. The processor transforms data into new data using implemented data structures and methods, such as is described with reference to the figures herein.

The engines described herein, or the engines through which the systems and devices described herein can be implemented, can be cloud-based engines. As used herein, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used herein, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described herein.

Datastores can include data structures. As used herein, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described herein, can be cloud-based datastores. A cloud based datastore is a datastore that is compatible with cloud-based computing systems and engines.

The virtual tooth representation management engine 1002 may include one or more automated agents configured to gather virtual representations of teeth of a patient from the virtual tooth representation datastore 1012. The virtual tooth representation management engine 1002 may provide an identifier of a patient and retrieve from the virtual tooth representation datastore 1012 virtual representations of teeth of the patient. In various implementations, the virtual tooth representation management engine 1002 renders a 3D virtual representation of teeth for display on a computer display. As an example, the virtual tooth representation management engine 1002 may load 3D graphics corresponding to various perspectives (sagittal, median, frontal/coronal, transverse/axial etc. perspectives) of a patient's teeth.

The optional force system analysis engine 1004 may include one or more automated agents configured to gather an orthodontic treatment plan from the optional treatment plan datastore 1014. In some implementations, the optional force system analysis engine 1004 is configured to gather from an orthodontic treatment plan a set of positional force systems to apply to a patient's teeth. The positional force systems may include linear forces, torques, anchor forces, etc. that are to be applied to the patient's teeth over the course of the orthodontic treatment plan. The positional force systems may be implemented by aligners, attachments, or some combination thereof. In some implementations, the optional force system analysis engine 1004 provides identifiers of attachments for the treatment plan to other modules, such as the virtual attachment representation engine 1012. The optional force system analysis engine 1004 may identify size(s), shape(s), orientation(s), and/or location(s) of the specific attachments.

The virtual attachment representation engine 1012 may include one or more automated agents configured to gather virtual representations of one or more attachments from the virtual attachment datastore 1016. In some implementations, the virtual attachment representation engine 1012 receives identifiers of virtual attachments from an attachment template designer; in some, not necessarily exclusive, implementations, the virtual attachment representation engine 1012 receives identifiers of virtual attachments from the optional force system analysis engine 1004. The virtual representations of one or more attachments may take the form of a virtual rendering of the attachment(s), and/or positional data corresponding to the location(s), orientation(s), etc. of physical attachments corresponding to the virtual attachments on a patient's teeth.

As noted herein, the virtual attachment representation management engine 1012 may include one or more automated agents configured to facilitate creation of virtual openings that allow for formation of virtual attachments using an attachment template. In some implementations, the virtual attachment representation management engine 1012 identifies a virtual region near a positions of a virtual representation of an attachment to designate as a virtual opening. The virtual region may have a size, shape, and/or contour associated with it. As noted further herein, the virtual attachment representation management engine 1012 may provide information about identified virtual openings to other modules, such as the 3D surface modeling engine 1008.

The 3D surface modeling engine 1008 may include one or more automated agents configured to create virtual 3D surface models of 3D virtual representations of teeth and/or virtual representations of one or more attachments. The 3D surface modeling engine 1008 may facilitate superimposition and/or other arrangements of virtual representations of one or more attachments and 3D virtual representations of teeth. In some implementations, the 3D surface modeling engine 1008 generates a virtual representation of an attachment over a 3D virtual representation of teeth using the size(s), shape(s), and/or positions of physical counterparts to these virtual items. The 3D surface modeling engine 1008 may create a 3D surface model that corresponds to a negative or a mold of the 3D virtual representations of teeth and/or virtual representations of one or more attachments. The 3D surface model may have one or more virtual regions for virtual opening(s) associated with the virtual attachments.

The 3D surface export engine 1010 may include one or more automated agents configured to export a 3D surface model. The 3D surface export engine 1010 may save a 3D surface model in a relevant format, configure a 3D surface model for streaming, and/or format a 3D surface model for 3D printing, for instance.

The virtual tooth representation datastore 1012 may be configured to store virtual representations of teeth. The virtual tooth representation datastore 1012 may index the virtual representations of teeth by patient and/or by stage of a treatment plan. As noted further herein, the virtual representations of teeth may comprise position(s), orientation(s), etc. of teeth of a patient that is relevant to application of orthodontic aligners to the patient. In some implementations, the virtual representations of teeth are estimates/approximations of a patient's teeth at a beginning, end, or intermediate stage of an orthodontic treatment plan. In some implementations, virtual representations of teeth are stored as virtual objects that can be accessed by the engines described herein.

The optional treatment plan datastore 1014 may be configured to store treatment plan data. The treatment plan data may include instructions to apply aligners and/or attachments to teeth to generate various orthodontic outcomes. The treatment plan data may, for instance, include instructions to apply force positioning systems to teeth at different times in order to achieve translations, rotations, anchors, etc. to those teeth.

The virtual attachment datastore 1016 may be configured to store virtual representations of attachments. The virtual representations of attachments may include size parameters, shape parameters, orientation parameters, as well as force parameters related to how various attachments interact with aligners to achieve orthodontic treatment outcomes. In some implementations, virtual representations of attachments are stored as virtual objects that can be accessed by the engines described herein.

Example Flowcharts of Methods of Operation

Figure 14:
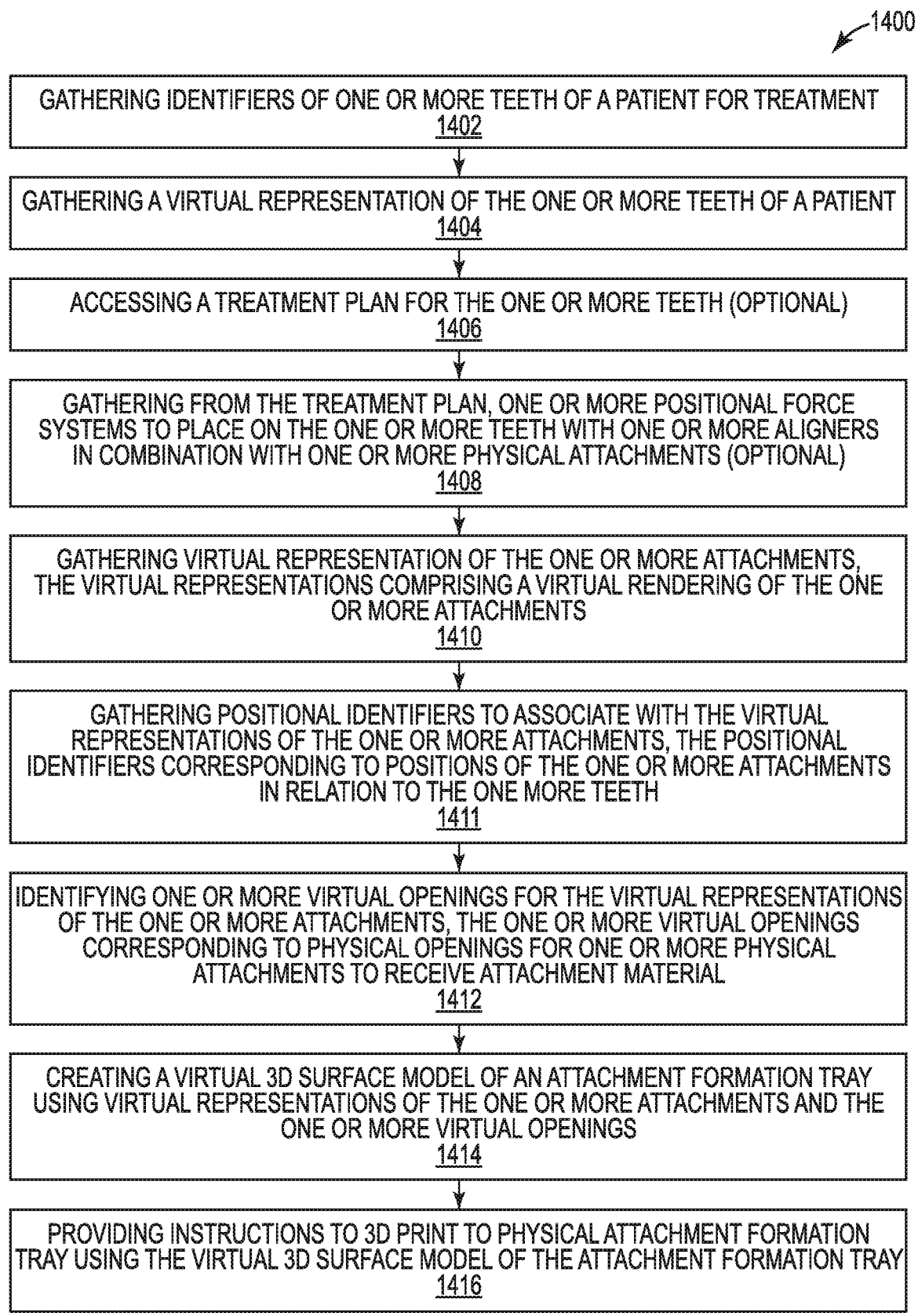
FIG. 14 illustrates an example flowchart of a process for providing instructions to create an attachment template using a virtual 3D surface model of the attachment template.

FIG. 14 illustrates an example flowchart 1400 of a process for providing instructions to create an attachment template using a virtual 3D surface model of the attachment template. The flowchart 1400 is discussed in conjunction with the attachment modeling system 1000B, though it is noted other structures (e.g., the structures of the computer system 1000A) may implement at least portions of the flowchart 1400. As an example, the processor 1038 may provide instructions to execute the executable instructions 1050 to perform at least some of the operations of the flowchart 1400.

At an operation 1402, identifiers of one or more teeth of a patient for treatment are gathered. In an implementation, the virtual tooth representation management engine 1002 receives from a designer or from an automated agent identifiers of teeth of a patient for treatment. The teeth may include those teeth of a patient undergoing orthodontic treatment according to a treatment plan. In some implementations, the teeth are all or some of the teeth on a jaw (a mandible or maxilla) of a patient. These teeth may be identified by Universal Tooth Number or other convenient formats. These teeth may be identified by a designer of an attachment template (e.g., a CAD designer) or through an automated agent configured to facilitate design of an attachment template.

At an operation 1404, a virtual representation of the one or more teeth of the patient are gathered. The virtual tooth representation management engine 1002 may gather from the virtual tooth representation datastore 1012 a virtual representation of the teeth that have been identified for treatment. The virtual representation may comprise position(s), orientation(s), etc. of teeth that are to be identified for treatment.

At an optional operation 1406, a treatment plan for the one or more teeth may be accessed. The optional force system analysis engine 1004 may gather from the optional treatment plan datastore 1014 a treatment plan for the teeth. The treatment plan may specify positional forces and/or positional force systems to place on the teeth. The treatment plan may involve application of aligners and/or attachments in order to effect application of the positional forces.

At an optional operation 1408, one or more positional force systems to place on the one or more teeth using one or more aligners in combination with one or more dental attachments may be gathered. The optional force system analysis engine 1004 may further identify positional forces and/or positional force systems based on treatment plans for the teeth. The optional force system analysis engine 1004 may provide identifiers of aligners and/or attachments to achieve the outcomes of a treatment plan.

At an operation 1410, virtual representations of one or more attachments may be gathered. The virtual attachment representation management engine 1006 may gather from the virtual attachment datastore 1016 virtual representations of one or more attachments. In some implementations, the attachments are specified by a designer of an attachment template. In various implementations, the attachments (possibly along with corresponding aligners) are identified as part of a treatment plan by the optional force system analysis engine 1004. The virtual representations of the attachments may include size(s), shape(s), orientation(s), etc. of the attachments. The virtual representations may comprise virtual rendering(s) of the one or more attachments.

At an operation 1411, positional identifiers of the one or more attachments are gathered. The positional identifiers may serve to position the one or more attachments relative to specific teeth modeled by the virtual representation of the teeth. In various implementations, the positional identifiers are inferred from positional force systems (see optional operation 1408) and/or treatment plans (see optional operation 1406). The positional identifiers may also correspond to one or more positions for attachments input by a designer seeking to design an attachment template. The positional identifiers may correspond to positions of attachment(s) in relation to a patient's teeth.

The virtual representations of the attachments may also comprise positional data corresponding to positions of the one or more attachments on the one or more teeth.

At an operation 1412, one or more virtual openings for the virtual representations of the one or more attachments are identified. The virtual attachment representation management engine 1012 may facilitate identification of one or more virtual openings for the virtual representations of the one or more attachments. In various implementations, the virtual openings may correspond to physical openings in an attachment template for physical attachments to receive attachment material and/or receive curing radiation.

At an operation 1414, a virtual 3D model of an attachment template is created using the virtual representations of the one or more attachments and the one or more virtual openings. The 3D surface modeling engine 1008 may provide instructions to superimpose virtual representations of attachments over virtual representations of teeth that have been identified. The 3D surface modeling engine 1008 may further provide instructions to render virtual openings corresponding to physical openings that, in the attachment template, may be used to receive attachment material and/or curing radiation.

At an operation 1416, instructions to 3D print an attachment template using the virtual 3D surface model of the attachment template may be provided. The 3D surface export engine 1010 may provide instructions to save, stream, and/or 3D print the virtual 3D surface model to create an attachment template.

Figure 15:
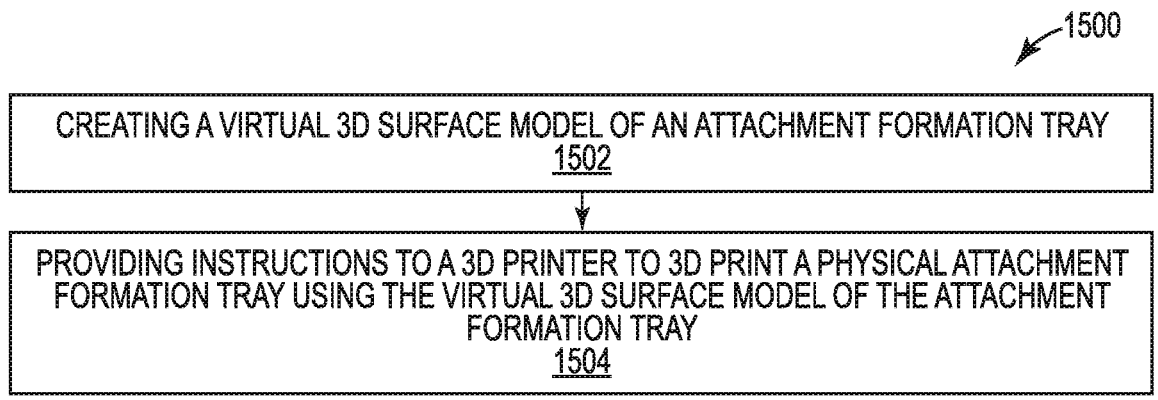
FIG. 15 illustrates an example flowchart of a process for 3D printing an attachment template.

FIG. 15 illustrates an example flowchart 1500 of a process for 3D printing an attachment template. The flowchart 1500 is discussed in conjunction with the structures of the computer system 1000A shown in FIG. 10A, though it is noted other structures may implement the operations of the flowchart 1500.

At an operation 1502, a virtual 3D surface model of an attachment template is gathered. The processor 1038 may gather a virtual 3D surface model of an attachment template formed, e.g., by the attachment modeling system 1000B and/or stored in the memory 1046 or the datastore 1048.

At an operation 1504, instructions to a 3D printer to 3D print an attachment template using the virtual 3D surface model of the attachment template are provided. In some implementations, the processor 1038 may provide the printer 1086 with computer program instructions to 3D print an attachment template using the virtual 3D surface model of the attachment template. The printer 1086 may correspondingly 3D print an attachment template using the virtual 3D surface model of the attachment template.

Figure 16:
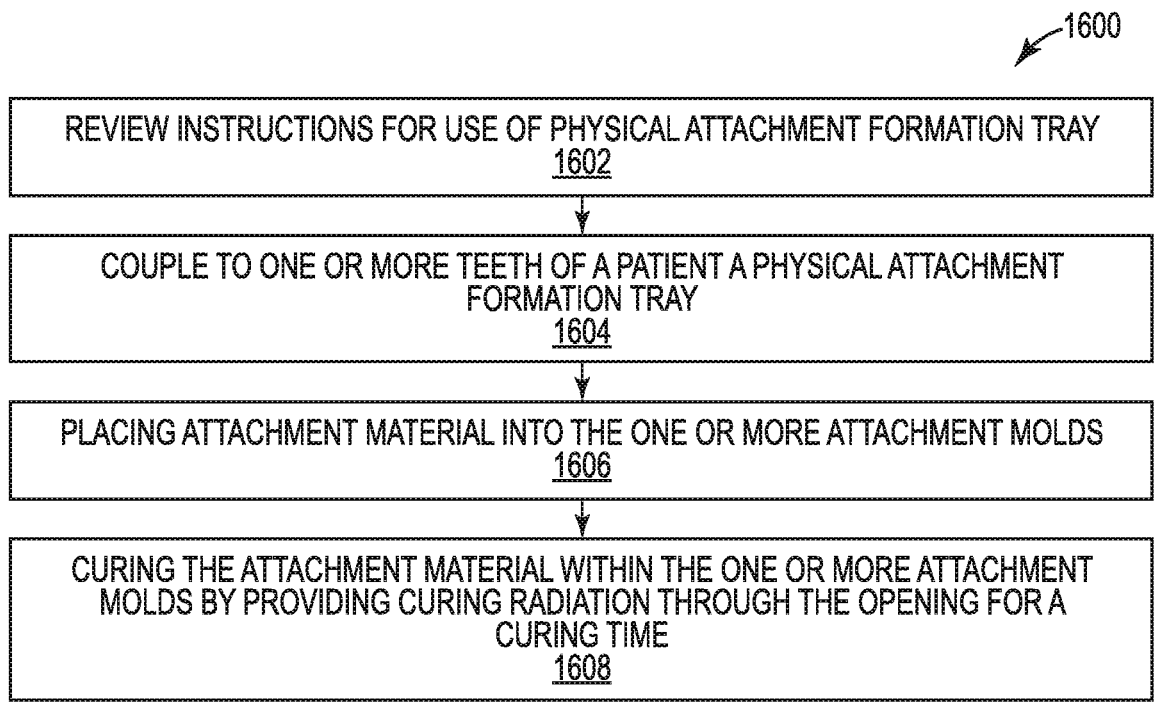
FIG. 16 illustrates an example flowchart of a process for creating attachments on a patient's teeth using an attachment template.

FIG. 16 illustrates an example flowchart 1600 of a process for creating attachments on a patient's teeth using an attachment template. The process 1600 may be implemented by a dental or orthodontic practitioner to form and/or cure attachments on a patient's teeth.

At an operation 1602, instructions for use of an attachment template may be reviewed. At an operation 1604, an attachment template may be coupled to a patient's teeth. In various examples, the attachment template 100 (see FIG. 1) or the attachment template 220 (see FIG. 2) may be placed over/adjacent to the facial (e.g., buccal) area of a patient's teeth. Placing the attachment template may include aligning an inner surface of the template so that is registers with one or more tooth surfaces of the patient's dental arch. As described herein, registering can involve matching a shaped surface of the template with a corresponding shaped surface of one or more teeth. The attachment template can be configured to place one or more mold cavities in the attachment template adjacent one or more teeth. In some cases, the attachment template is pressed or shifted with respect to the patient's dental arch to assure alignment of the of the one or more mold cavities.

At an operation 1606, one or more attachment materials may be placed into the one or more mold cavities. In some cases, the attachment material is in a flowable state and is injected into the attachment mold(s) via one or more openings in the attachment template that provide access to the one or more mold cavities. The injecting may be done manually using, for example a syringe, or automatically using, for example a pump system. In some cases, the syringe or pump is connected to the one or more openings via tubing or a needle. Placing (e.g., injecting) the attachment material(s) can put the one or more teeth in contact with the attachment material(s). As various examples, uncured attachment material 108 may be placed into an attachment mold formed by opening 107 within cavity 106 (see FIG. 1). As another example, uncured attachment material 228 may be placed into an attachment mold formed by opening 207 within cavity 206 (see FIG. 2). In some cases, the attachment template is shifted before and/or during the injecting of attachment material to assure the correct placement of the attachment material with respect to the tooth/teeth. The attachment template may also be pressed toward the tooth/teeth, for example at the attachment region(s), to help seal the attachment template against the tooth/teeth and prevent attachment material from escaping during the injecting. The injection process may be controlled by the speed of the injecting. In some cases, the practitioner may rely on manually sensing resistance feedback during the injection in order to determine whether to speed up, slow down and/or stop the injecting.

In some embodiments, multiple attachment materials are used. For example, a first material may be injected first, followed by injecting a second material. In some cases, the first and second materials may have different properties. For example, the first material may have a different viscosity, hardness, compliance and/or adhesive property than the second material.

At an operation 1608, the attachment material may be cured within the one or more attachment molds by providing curing radiation for a curing time. The curing radiation may be shone through the one or more openings and/or through a transparent portion of the template. As an example of this operation, the attachment material 108 (see FIG. 1) may be cured within an attachment mold by shining light from the light source 110 on the attachment material 110 for a specified amount of time (e.g., until the attachment material 108 cures). As another example of this operation, the attachment material 228 (see FIG. 2) may be cured within an attachment mold by shining light from the light source 210 on the attachment material 228 for a specified amount of time (e.g., until the attachment material 228 cures).

After the attachment material is sufficiently cured and bonded to the tooth/teeth, the attachment template may be separated from the attachment(s) and removed from the patient's mouth. In some cases, removing the template involves breaking or cutting the template using a tool, such as a cutting tool. In some cases, removing the template involves bending or breaking the template along one or more compliant regions of the template. Once the attachment template is removed, the attachment(s) may undergo one or more post-forming processes. For instance, the attachment(s) may be trimmed to remove excess attachment material. In some cases, the attachment(s) may be shaped to provide a particular interaction with one or more aligners.

Example Screen Captures

Figure 11:
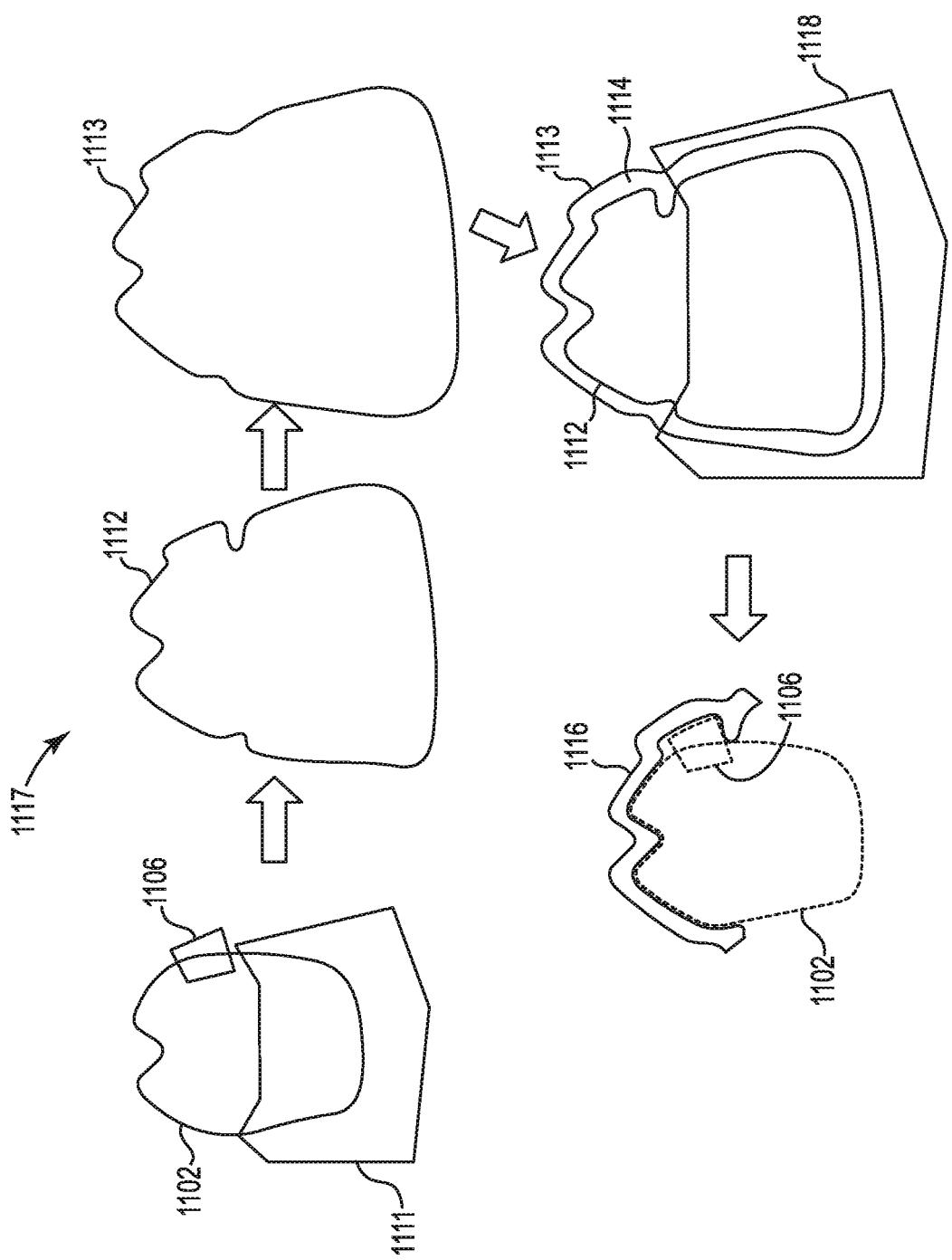
FIG. 11 illustrates screen captures of an implementation of an example process of creating a digital attachment template attachment according to a number of embodiments of the present disclosure.

FIG. 11 illustrates screen captures of an implementation of an example of a process of creating a digital attachment template according to a number of embodiments of the present disclosure. The process 1117 can include performing a three-dimensional Boolean operation to union an attachment 1106, a gingiva shape 1111, and a crown 1102 of a tooth of a digital dental model to create an inner shape 1112, performing an offset operation by a thickness to create an outer shape 1113, performing a subtraction operation to subtract the inner shape 1112 from the outer shape 1113 to create a shell shape 1114, and performing a subtraction operation to subtract the gingiva cut shape 1118 from the shell shape 1114 to form an attachment template 1116. An attachment template (e.g., attachment template 104 in FIG. 1) can be three-dimensionally printed based on the digital attachment template 1116.

The attachment 1106 can be one or more shapes. In some implementations, the shapes are complex shapes that could not have been formed through thermoforming techniques. For example, the digital attachment can be, but is not limited to, a rectangle, ellipsoid, morphed, hook, button, donut, and bracket. In some embodiments, the attachment 1106 can be selected based on a treatment plan and the treatment plan can be based on the digital dental model including the crown 1102. The digital dental model can be received or uploaded, for example, from a three-dimensional scanner. In some examples, the three-dimensional scanner can scan the contours of the exterior surfaces of one or more teeth of a patient to create the digital dental model.

The thickness of the attachment template 1116 can be determined by the offset operation when creating the outer shape 1113. The thickness can be selected based on the treatment plan depending on for example, forces necessary to move or prevent movement of a tooth and/or forces necessary to prevent deformation of the opening (e.g., opening 107 in FIG. 1) and/or cavity (e.g., cavity 106 in FIG. 1).

The digital attachment template can be exported as a file. For example, the digital attachment template can be exported as a stereolithography file (STL file). The file can be sent to or uploaded to a three-dimensional printer to three-dimensional print the attachment template. The attachment template can be printed via fused deposition modeling (FDM), stereolithography (SLA), or selective laser sintering (SLS), for example.

In some embodiments, the process 1117 can be performed to place a second attachment based on the treatment plan on the first crown surface and/or a second crown surface of a second tooth of the digital dental model. The process 1117 can also be performed to create a second digital attachment template from the digital dental model including the second attachment on the second crown surface.

The process 1117 can further include performing a subtraction operation to subtract a cut shape from the digital attachment template 1116 or create the cut shape after the attachment template is three-dimensionally printed using a knife or a scissors, for example.

Figure 12:
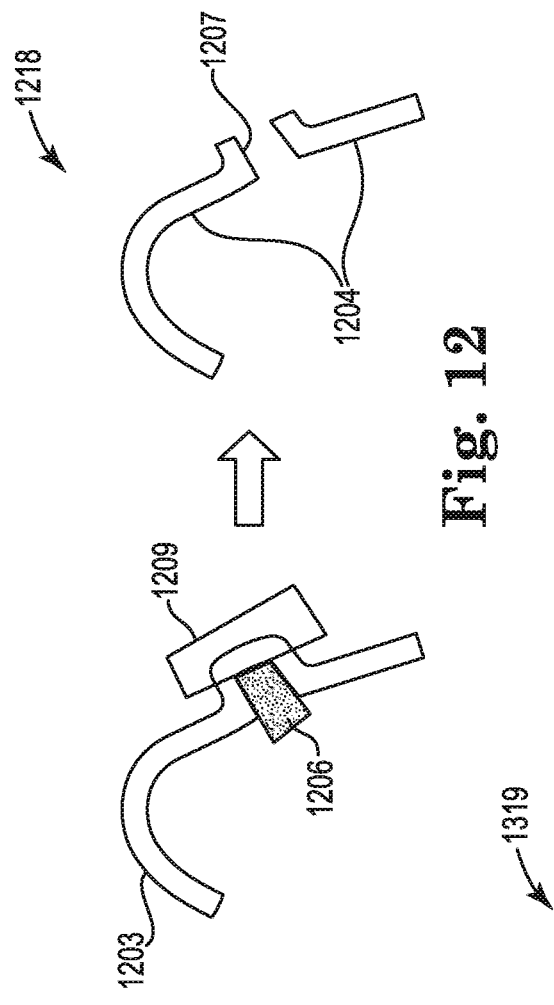
FIG. 12 illustrates screen captures of an implementation of an example process of creating an opening in a digital attachment template attachment according to a number of embodiments of the present disclosure.

FIG. 12 illustrates screen captures of an implementation of an example of a process of creating an opening in a digital attachment template according to a number of embodiments of the present disclosure. The process 1218 can include placing a digital cut shape 1209 on the digital attachment template 1203. The cut shape 1209 can be subtracted from the digital template 1203 to create the digital template 1204 including an opening 1207.

In some embodiments, the cut shape 1209 contacts the attachment 1206 to ensure the opening 1207 will allow uncured attachment material to reach a cavity (e.g., cavity 106 in FIG. 1) that forms the attachment 1206. For example, the opening 1207 permits insertion of uncured attachment material (e.g., uncured attachment material 108 in FIG. 1) into the cavity of the attachment template 1203. In some examples, the opening 1207 can also be used to permit light to enter the cavity of the attachment template.

Figure 13:
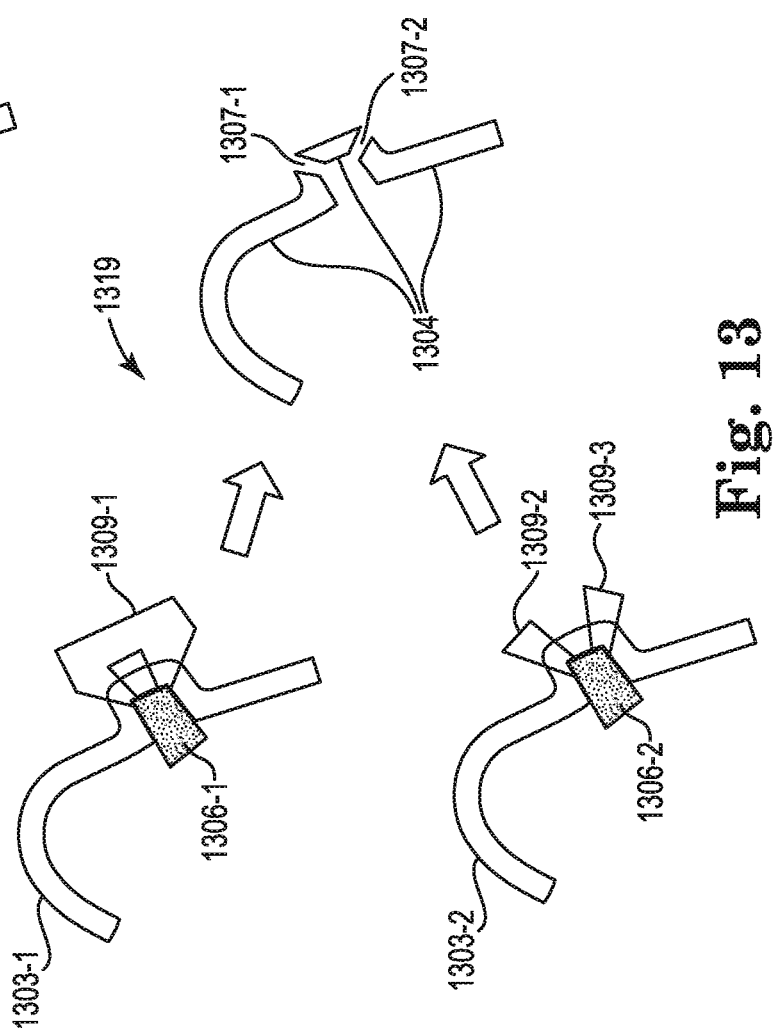
FIG. 13 illustrates screen captures of an implementation of an example process of creating an opening in a digital attachment template attachment according to a number of embodiments of the present disclosure.

FIG. 13 illustrates screen captures of an implementation of an example of a process of creating an opening in a digital attachment template. The process 1319 can include placing a cut shape 1309-1 or a number of cut shapes 1309-2, 1309-3 on the digital attachment templates 1303-1, 1303-2. The cut shapes can 1309-1, 1309-2, 1309-3 can contact, and in some cases overlap with, the templates 1303-1, 1303-2. The cut shapes 1309-1, 1309-2, 1309-3 can be subtracted from the digital templates 1303-1, 1303-2 to create the digital template 1304 including a number of openings 1307-1, 1307-2.

As shown in FIG. 13, the cut shapes 1309-1, 1309-2, 1309-3 can include one or more shapes. In some examples, the cut shapes 1309-1, 1309-2, 1309-3 can include one or more wedges, cylinder, polygonal or tube shapes to form the opening(s). The cut shapes 1309-1, 1309-2, 1309-3 can be selected based on a treatment plan, which can be based on the digital dental model of the patient's teeth.

As described above, the methods and apparatuses described herein for forming attachments on the tooth are configured to directly form the one or more attachments on the tooth of the patient by injecting the flowable material into the template placed on the dental arch (e.g., over the teeth). The template may be configured so that pressure is exchanged or released by the apparatus, which may include the injection component in addition to the template or separately from the template. For example, in some variations the template is configured so that the template does not become released from the teeth by the force of the additional pressure as the flowable material is injected into the cavity of the template. In some variations the cavity may include a pressure release hole or opening, that may permit the release of air (or any other fluid, including liquid) from the cavity as it is displaced by the injected flowable material. In some variations the cavity may include a seal or seals around the cavity. For example, the region immediately around the cavity on the template may include a sealing material (a ring or perimeter around the cavity, such as an adhesive, hydrogel, etc.) and/or a gasket or other material (silicone, rubber, etc.) that prevents the force due to the injection from displacing the template off of the teeth.

In some variations the injection may be from a device (injector) that applies a negative pressure to the template (e.g., into the cavity/cavities) of the template. The negative pressure may be applied to draw the flowable material into the cavity and/or to remove air or other material from the cavity as the flowable material is injected. Note that the use of negative pressure in this manner is still considered injection of the material in the context of this disclosure.

For example, in some variations an injector or injection device may include a dual- (or multi-) lumen needle for injecting into the cavity; one lumen may apply the flowable material while the second lumen may be used to vent and/or apply negative pressure.

The arrangement of the hole(s) in the template may be configured as described herein to allow the injection while concurrently venting, while preventing distortion(s) of the formed attachment; in particular the venting and/or injecting opening(s) may be positioned on a portion of the template such that they are on a portion of the molded attachment that is offset from a surface of the attachment which is configured to contact the dental device (e.g., aligner) when it is worn on the teeth. For example, a vent opening may be on a lateral side (through the template width), an in particular, on a top region, facing the occlusal surface of the teeth when applied to the teeth. Typically the lateral side of the attachment closet to the occlusal surface either does not engage with the aligner when the aligner is retained by the attachment and/or does not engage with significant force. Thus imprecision in the shape of the attachment do to the injection and/or vent holes at these locations may not interfere with the retention of the aligner by the attachment(s) when worn.

The methods and apparatuses configured to design the template(s) described herein may be further configured to account for the optimal location(s) of the openings, as described above. In some variations, the method or apparatus for performing the method may determine the position of the opening(s) based on the predicted forces acting on the attachment when an aligner is worn on the teeth. In particular, the method or apparatus may position the opening(s) in regions in which a minimal level of force is to be applied.

As already mentioned above any of the templates may be configured to be destructively removed from the dental arch once the attachments are set; this may be because the attachments include undercut regions (as described above, e.g., in FIG. 6) in which the base of the attachment nearest to the tooth (more proximal to the tooth) is narrower than the regions more distal to the tooth. For example, any of these templates may include a frangible structure that may allow the template, and particularly the portion forming the cavity or a portion of the cavity, may break away as the template is removed, preventing damage to the formed attachment on the tooth.

In some variations the cavity includes an insert (e.g., a mold insert or a form insert) that is pre-loaded into the cavity that forms the undercut regions and may remain behind when the template is removed from the teeth; the mold or form may then be separately removed and/or released from the attachment after removing the template. The flowable material is injected into the cavity and into the mold/form within the cavity to shape the attachment, including in some variations an undercut region. The mold or form portion may be loose within the cavity and/or may be held within the cavity by an adhesive, by a frangible connection, or the like (including combinations of these); force applied to remove the template may break the connection, leaving the mold/form on the attachment and on the teeth until they are separately removed after removing the template.

The mold/form may be transparent or transmissive to the energy (e.g., light) used to cross-link or set the flowable material. In some variations the mold or insert may be impregnated, coated or otherwise may contain and release a material that may cross-link or set the injected flowable material.

The methods and apparatuses configured to design the template(s) described herein may be further configured to account for the mold/form(s) and may include these in their designs; the mold or form portion that is separately removable from the template may be formed of the same material as the template.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of forming attachments on a tooth, the method comprising:
placing a template on a dental arch of a patient such that an inner surface of the template registers with one or more tooth surfaces of the dental arch, the inner surface having a first and second cavity adjacent a crown surface of a one or more teeth, wherein each of the first and second cavities has a hole that provides access to the first and second cavities from an outer surface of the template;
injecting a first attachment material in a flowable state into the first cavity via a corresponding hole within the template such that the first attachment material contacts the crown surface of the one or more teeth;
injecting a second attachment material in a flowable state into the second cavity via a corresponding hole within the template such that the second attachment material contacts the crown surface of the one or more teeth, wherein the first attachment material is different than the second attachment material;
bonding first and second attachments on the crown surface of the one or more teeth by curing the first and second attachment materials on the one or more teeth by shining light on the first and second attachment materials in the first and second cavities, wherein, once bonded, the first attachment material of the first attachment is configured to impart a different force characteristic on the one or more teeth than the second attachment material of the second attachment when one or more aligners engage with the first and second attachments; and
removing the template from the dental arch.

2. The method of claim 1, wherein shining light on the first and second attachment materials comprises shining light through the hole.

3. The method of claim 2, wherein the hole has a cross section area ranging from about 1 mm$^2$ to about 4 mm$^2$.

4. The method of claim 1, wherein shining light on the first and second attachments comprises shining light through a transparent portion of the template.

5. The method of claim 1, wherein each of the first and second cavities is within an attachment region of the template, wherein a thickness of walls of the attachment region is at least 0.5 mm.

6. The method of claim 5, wherein the thickness of walls of the attachment region ranges from about 0.5 mm and about 2.0 mm.

7. The method of claim 1, wherein removing the template comprises cutting the template using a tool.

8. The method of claim 1, wherein removing the template comprises bending the template along one or more slits in the template.

9. The method of claim 1, further comprising placing an aligner on the dental arch of the patient such that the aligner interacts with the first and second attachments.

10. The method of claim 1, wherein the template incudes a vent hole that allows excess uncured attachment material to flow out of the first and second cavities during the injecting.

11. The method of claim 1, wherein the template includes a vent hole that allows air to flow out of the first and second cavities during the injecting.

12. The method of claim 1, wherein the template includes one or more slits, one or more perforations, one or more scored regions, one or more thinner regions, and one or more regions made of compliant material.

13. The method of claim 1, wherein removing the template comprises splitting different portions of the template, wherein a first portion of the template includes the first cavity, and a second portion of the template includes the second cavity.

14. The method of claim 1, wherein removing the template from the dental arch further comprises bending the template.

15. The method of claim 1, wherein each of the first and second cavities is within an attachment region of the template, wherein a thickness of walls of each attachment region is thicker than a remaining thickness of the template.

16. The method of claim 1, wherein the first and second cavities are each within corresponding attachment regions of the template, wherein each of the attachment regions is made of a different material than a remainder of the template.

17. The method of claim 16, wherein each of the attachment regions is made of a more rigid material than the remainder of the template.

18. The method of claim 1, wherein the first attachment material has a different viscosity than the second attachment material.

19. The method of claim 1, wherein the first cavity is within a first attachment region of the template, and the second cavity is within a second attachment region of the template, wherein the first attachment region has a first wall thickness, and the second attachment region has a second wall thickness different than the first wall thickness.

20. The method of claim 1, wherein, once bonded, the first attachment material has a different hardness than the second attachment material.

21. The method of claim 13, wherein splitting different portions of the template comprises splitting the template between crowns of adjacent teeth of the patient.

* * * * *